US010181337B2

United States Patent
Tamura et al.

(10) Patent No.: US 10,181,337 B2
(45) Date of Patent: Jan. 15, 2019

(54) INFORMATION PROCESSOR, INFORMATION PROCESSING METHOD, AND PROGRAM

(71) Applicant: SONY CORPORATION, Tokyo (JP)

(72) Inventors: Shigefumi Tamura, Tokyo (JP); Itaru Shimizu, Tokyo (JP); Ryosuke Nomura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 103 days.

(21) Appl. No.: 15/305,886

(22) PCT Filed: Jun. 1, 2015

(86) PCT No.: PCT/JP2015/002766
§ 371 (c)(1),
(2) Date: Oct. 21, 2016

(87) PCT Pub. No.: WO2015/190061
PCT Pub. Date: Dec. 17, 2015

(65) Prior Publication Data
US 2017/0047095 A1    Feb. 16, 2017

(30) Foreign Application Priority Data

Jun. 9, 2014   (JP) .................. 2014-118607

(51) Int. Cl.
*G06F 1/16*     (2006.01)
*H04N 5/77*     (2006.01)
(Continued)

(52) U.S. Cl.
CPC ............ *G11B 27/32* (2013.01); *G11B 27/322* (2013.01); *G11B 27/34* (2013.01); *G11B 31/006* (2013.01);
(Continued)

(58) Field of Classification Search
CPC ....... G11B 27/32; G11B 27/322; G11B 27/34; G11B 31/006; G06F 1/163; H04N 5/77; H04N 5/9202
See application file for complete search history.

(56) References Cited

U.S. PATENT DOCUMENTS 6,563,532 B1    5/2003  Strub et al.
9,223,136 B1 *  12/2015 Braun ................. G02B 27/017
(Continued)

FOREIGN PATENT DOCUMENTS

JP   2004-287063 A    10/2004
JP   2012-533134 A    12/2012
WO   WO 2012/158588 A1  11/2012

OTHER PUBLICATIONS

Aslandogan, et al., "Techniques and Systems for Image and Video Retrieval", Transactions on Knowledge and Data Engineering, Jan.-Feb. 1999, pp. 56-63, vol. 11 No. 1, IEEE.
(Continued)

*Primary Examiner* — Huy T Nguyen
(74) *Attorney, Agent, or Firm* — Paratus Law Group, PLLC

(57) ABSTRACT

There is provided an information processor including circuitry configured to identify a part of a moving image in response to an audible sound input of a user, wherein the moving image is generated by a capturing of an imaging unit which is attached to the user.

7 Claims, 20 Drawing Sheets

(51) Int. Cl.
*H04N 5/92* (2006.01)
*G11B 27/32* (2006.01)
*G11B 27/34* (2006.01)
*G11B 31/00* (2006.01)

(52) U.S. Cl.
CPC ............. *H04N 5/77* (2013.01); *H04N 5/9202* (2013.01); *G06F 1/163* (2013.01)

(56) References Cited

U.S. PATENT DOCUMENTS

| | | | |
|---|---|---|---|
| 2003/0161097 A1* | 8/2003 | Le | G06F 1/163 361/679.03 |
| 2008/0036869 A1* | 2/2008 | Gustafsson | H04N 5/23203 348/222.1 |
| 2009/0175599 A1 | 7/2009 | Grim et al. | |
| 2013/0044042 A1 | 2/2013 | Olsson et al. | |
| 2014/0247368 A1* | 9/2014 | Chinn | H04N 5/23222 348/207.1 |

OTHER PUBLICATIONS

May 8, 2018, Japanese Office Action issued for related JP Application No. 2014-118607.
Nov. 6, 2018, Japanese Office Action issued for related JP Application No. 2014-118607.

* cited by examiner

[Fig. 1]
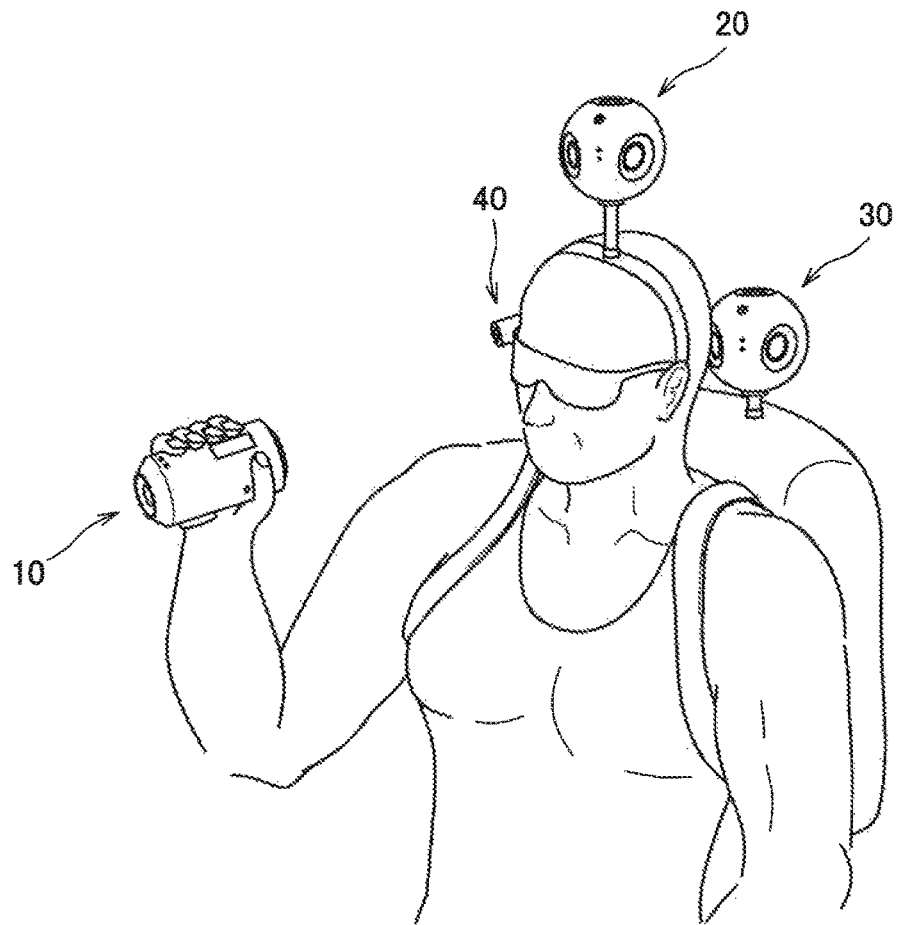
[Fig. 2]
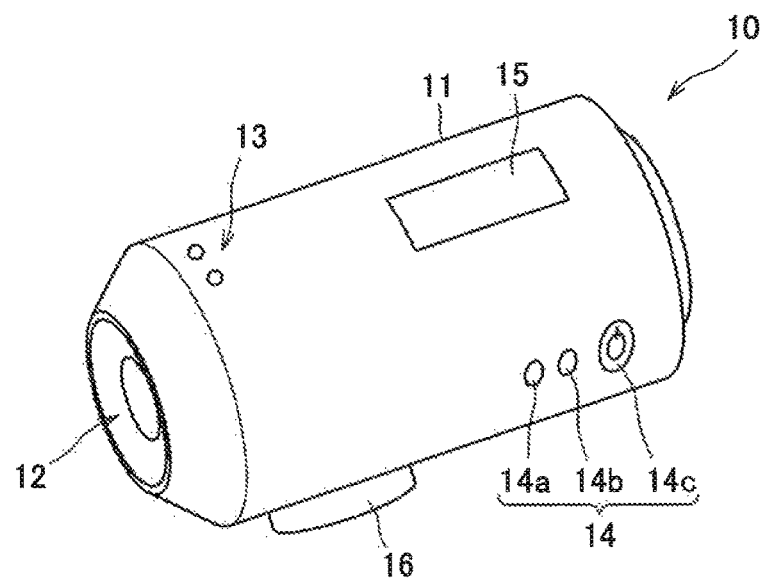

[Fig. 3]
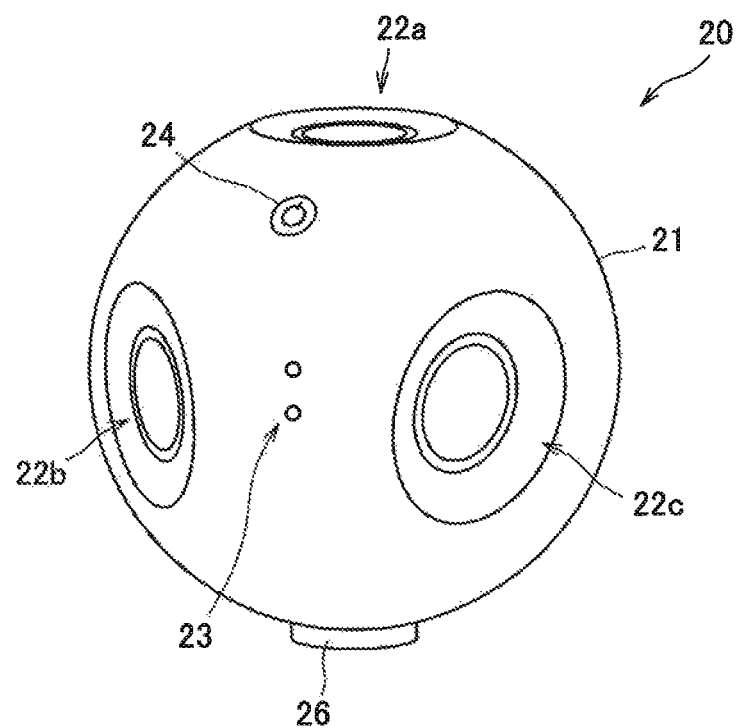

[Fig. 4]
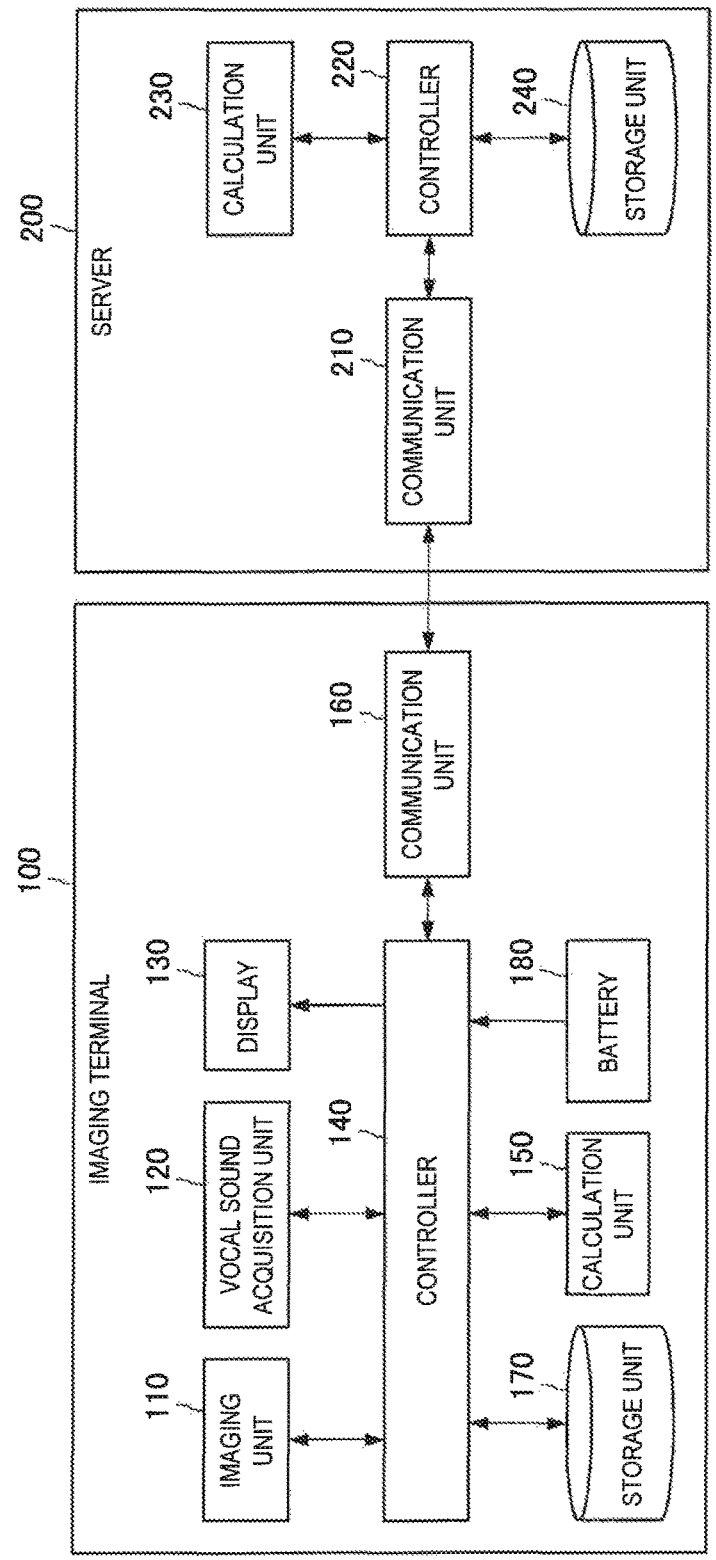

[Fig. 5]
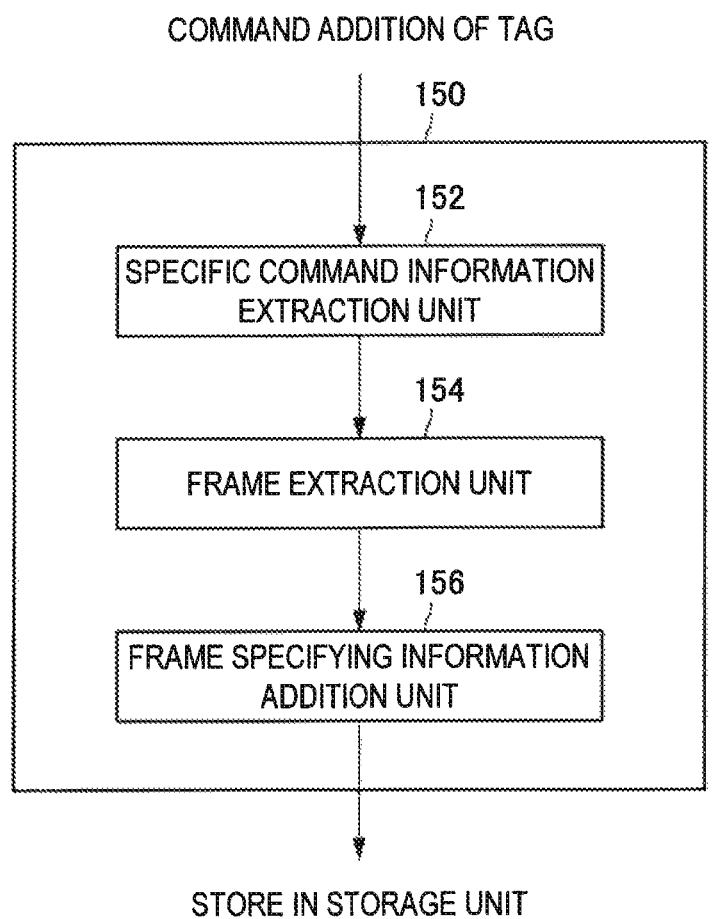

[Fig. 6]

| RECORDED INFORMATION | CONTENT | EXAMPLE OF INCLUDED INFORMATION |
|---|---|---|
| MOVING IMAGE FILE | SHOT IMAGE DATA | — |
| VOCAL SOUND FILE | RECORDED VOCAL SOUND DATA | — |
| METADATA FILE | INFORMATION AT TIME WHEN IMAGE DATA WAS ACQUIRED INFORMATION RELATED TO CONTENT OF IMAGE DATA | · GPS POSITIONAL INFORMATION<br>· RECORDING TIME<br>· SCENE INFORMATION (ANALYSIS INFORMATION)<br>· FACE RECOGNITION INFORMATION (ANALYSIS INFORMATION) |
| FRAME SPECIFYING INFORMATION | INFORMATION ADDED TO IMAGE DATA IN ORDER TO SPECIFY FRAME | · MARKING INFORMATION<br>· MARK COMMAND TIME INFORMATION<br>· ACCURACY INFORMATION |
| EXTERNAL INFORMATION | INFORMATION ACQUIRED THROUGH EXTERNAL SERVICE | · CHECK-IN INFORMATION |

[Fig. 7]
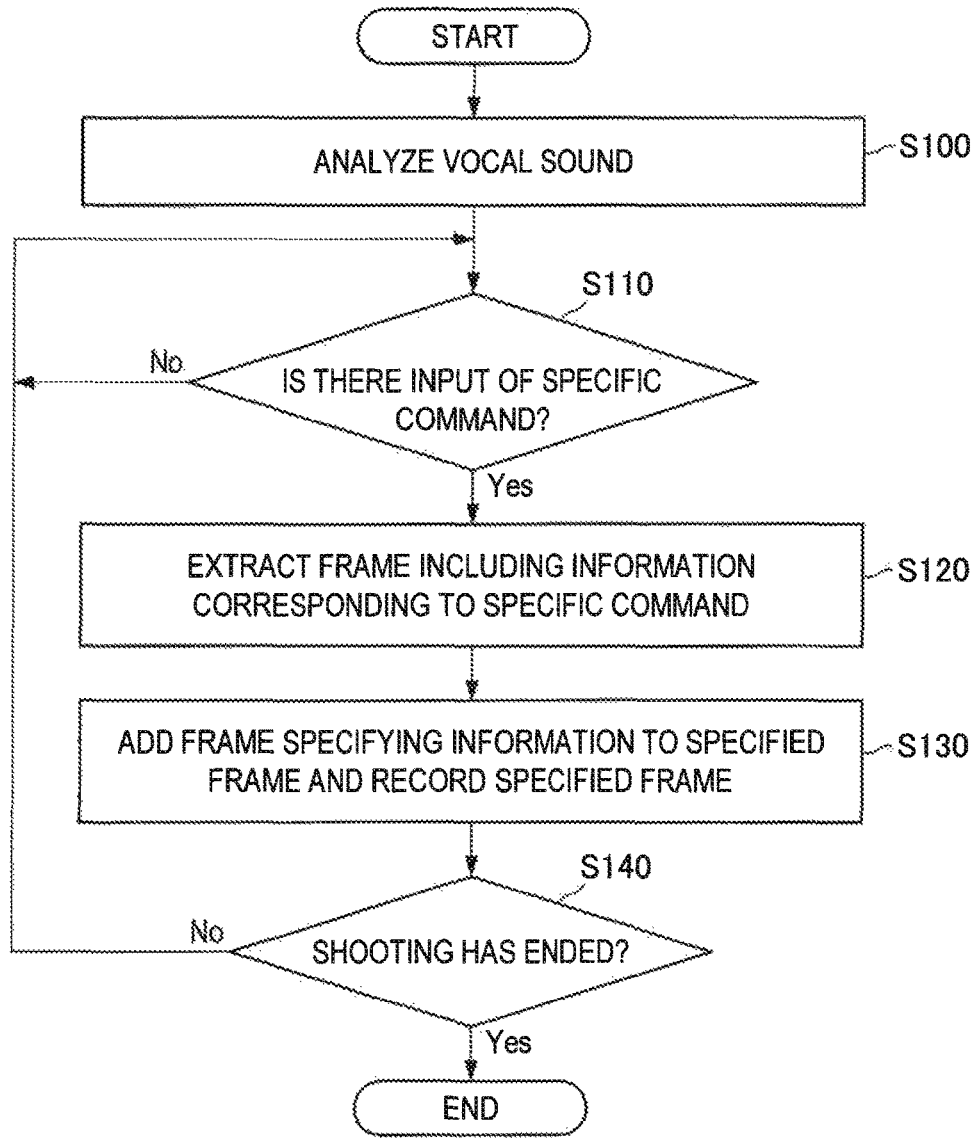

[Fig. 8]

| SPECIFIC COMMAND | CONTENT OF EXTRACTION |
|---|---|
| Record that | RECORD EARLIER POINT OR FROM EARLIER POINT |
| Record this | RECORD FROM PRESENT POINT OR FROM FEW MINUTES BEFORE |
| Record back XX minutes | RECORD FROM XX MINUTES BEFORE OR RECORD ± FEW MINUTES OF XX MINUTES BEFORE |
| Stop record | RECORDING STOP TIMING COMMAND WHEN COMMANDED FEW MINUTES AGO TO CONTINUE RECORDING |
| Record place of XX | RECORD PLACE RELATED TO XX |
| Record XX | SPECIFY NAME OF PERSON XX AND RECORD |
| Record if | SPECIFY RECORDING CONDITION AND RECORD FUTURE EVENT |
| Record newface | RECORD PERSON MET FOR THE FIRST TIME |
| Capture | RECORD REPRESENTATIVE STILL IMAGE |
| Reproduce | DISPLAY MOVING IMAGE/STILL IMAGE OF A CERTAIN CONDITION ON NEARBY TERMINAL |
| Move | WHEN CANDIDATE SCENE TO BE SPECIFIED IS DISPLAYED, COMMAND TO CHANGE THE SCENE |
| Select | SELECTION COMMAND WHEN THERE ARE A PLURALITY OF CANDIDATE SCENES |

[Fig. 9]
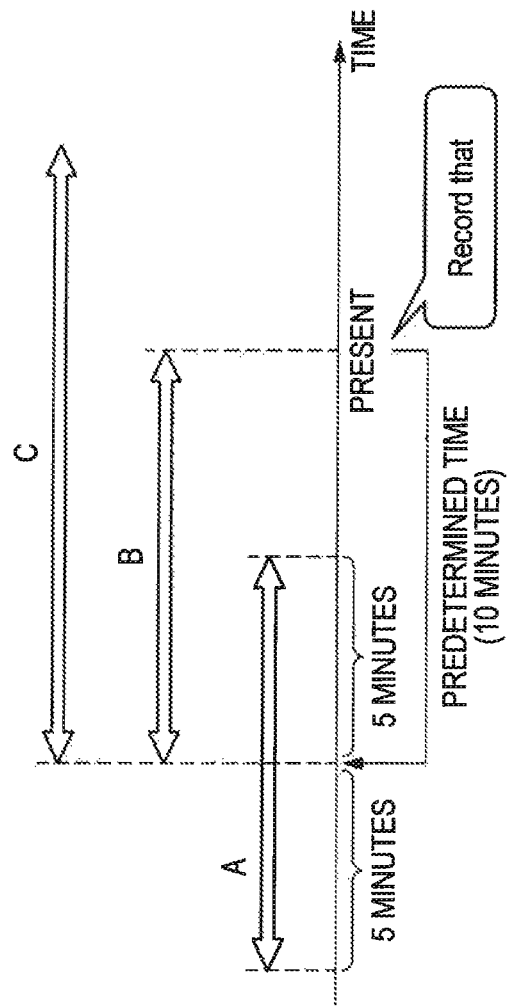

[Fig. 10]
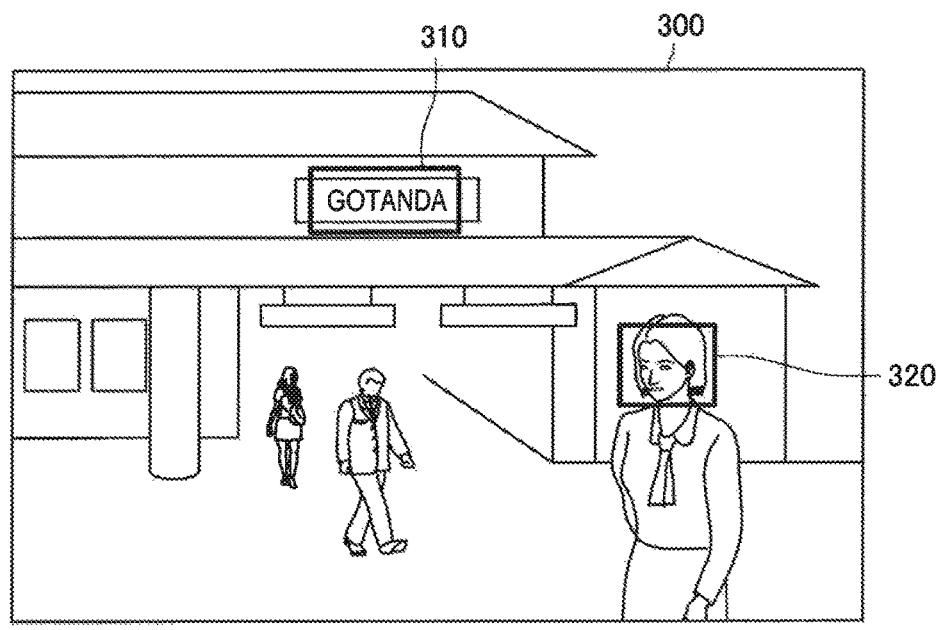

[Fig. 11]
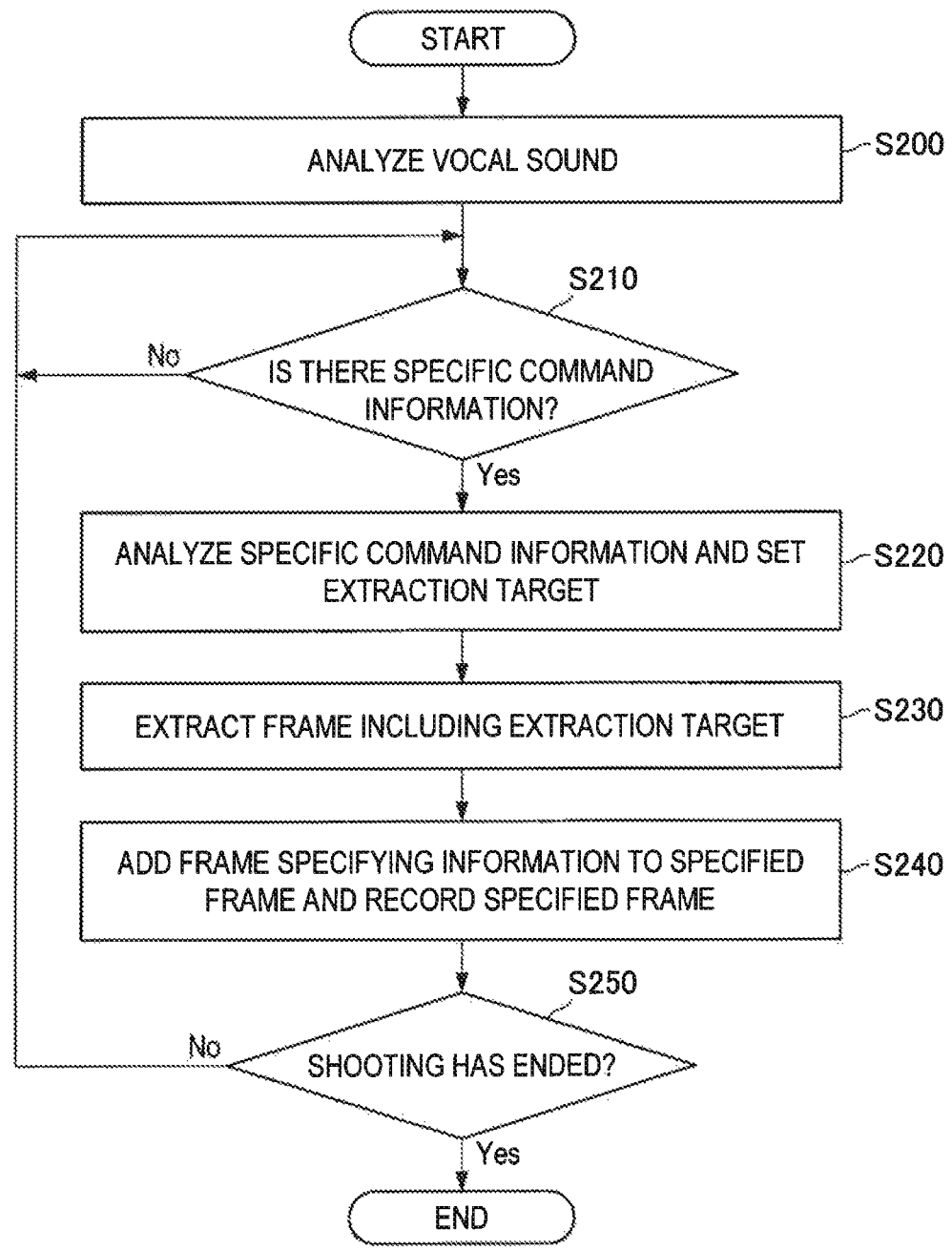

[Fig. 12]

| | SPECIFIC EXAMPLE |
|---|---|
| TIME | "X MINUTES BEFORE", "X DAYS BEFORE", "JUST NOW", "THE OTHER DAY"... |
| LOCATION | NAME OF PLACE, NAME OF SHOP... |
| PHOTOGRAPHIC SUBJECT | NAME OF PERSON, ANIMAL, BUILDING, NAME OF OBJECT... |
| ACTION | WHEN A PREDETERMINED ACTION HAS BEEN TAKEN |
| CIRCUMSTANCE | WHEN IT WAS RAINING... |
| VOCAL SOUND THAT BECOMES TRIGGER | "AWESOME", "GREAT", "WANT"... |

[Fig. 13]
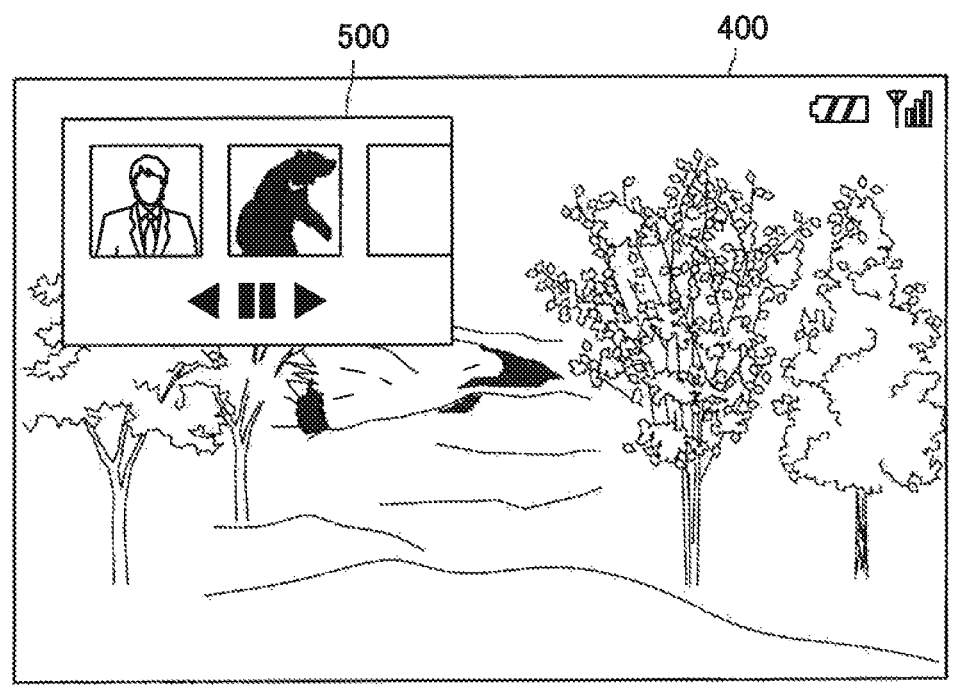

[Fig. 14]
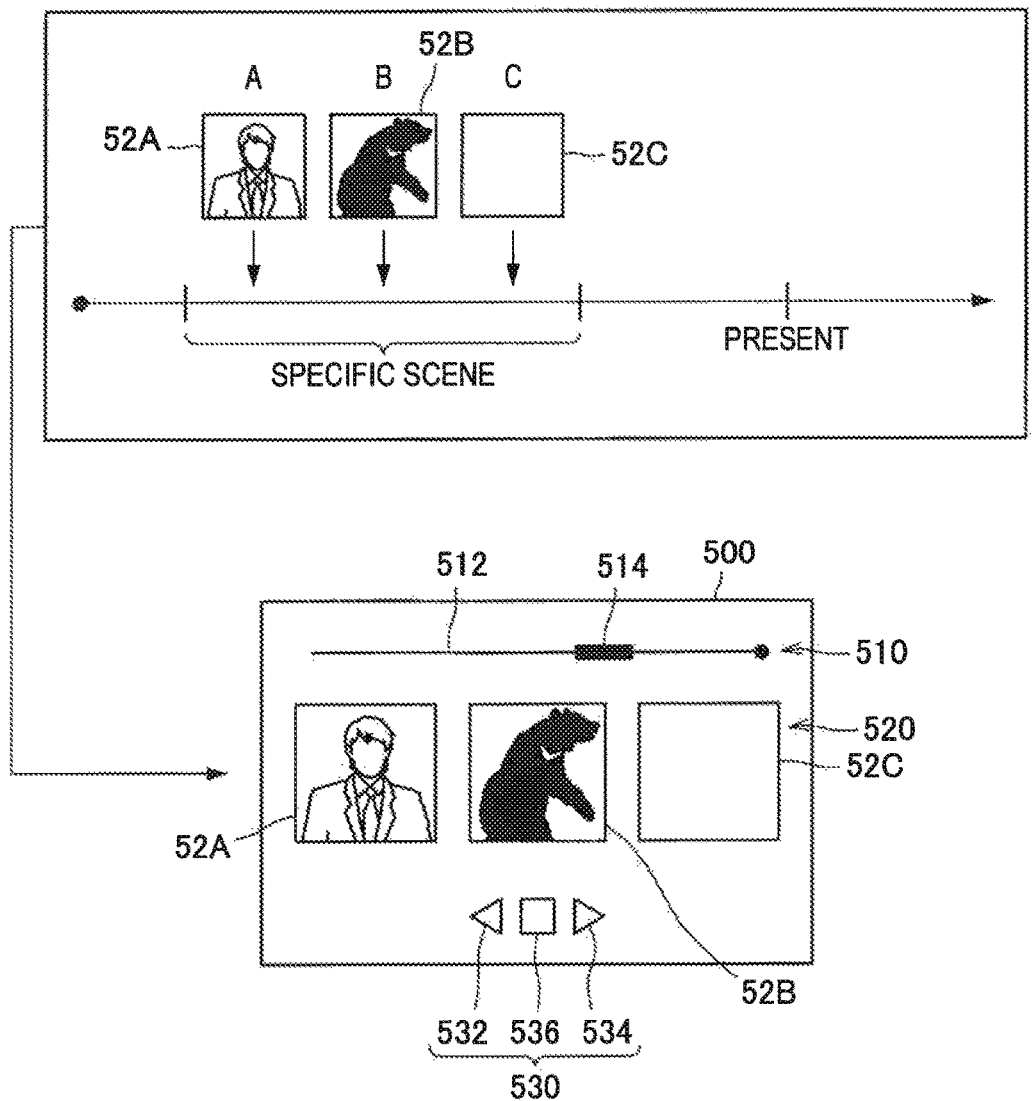

[Fig. 15]
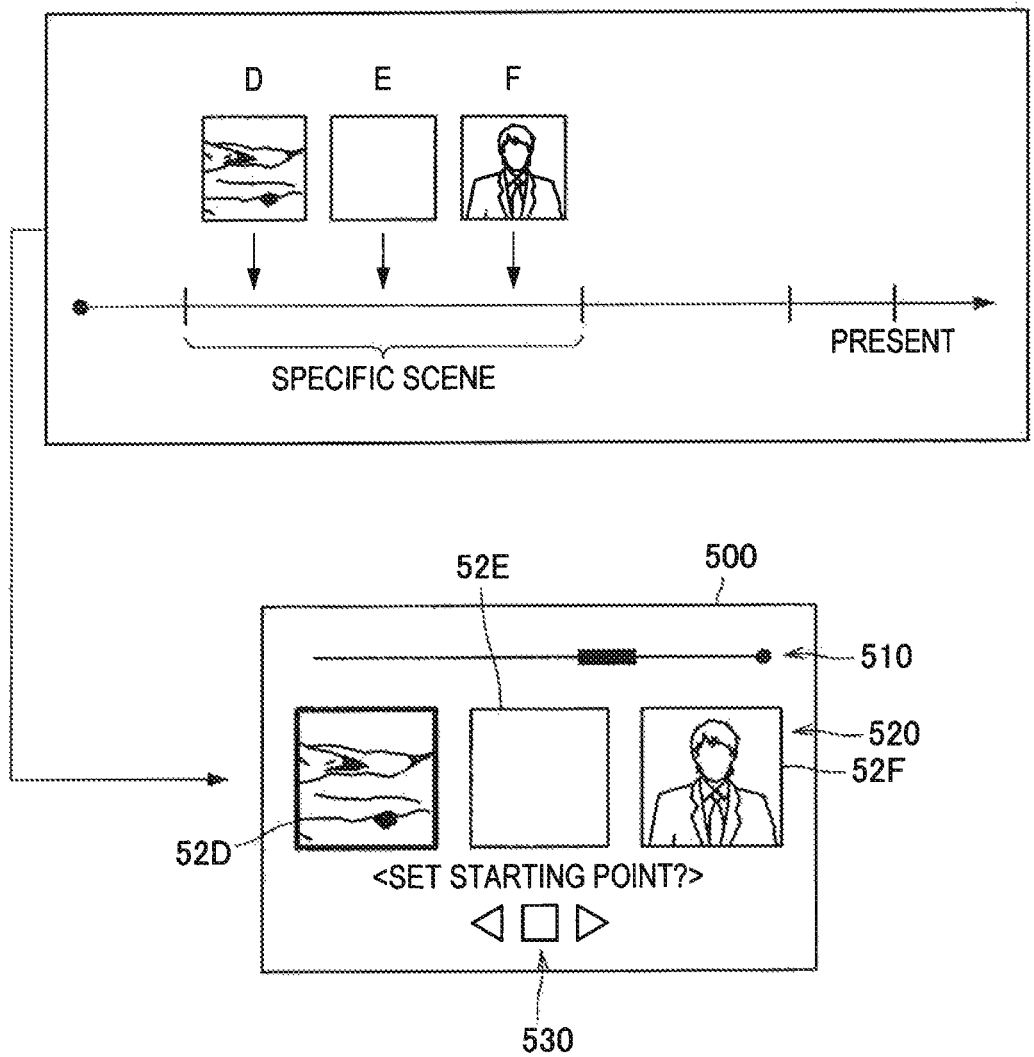

[Fig. 16]
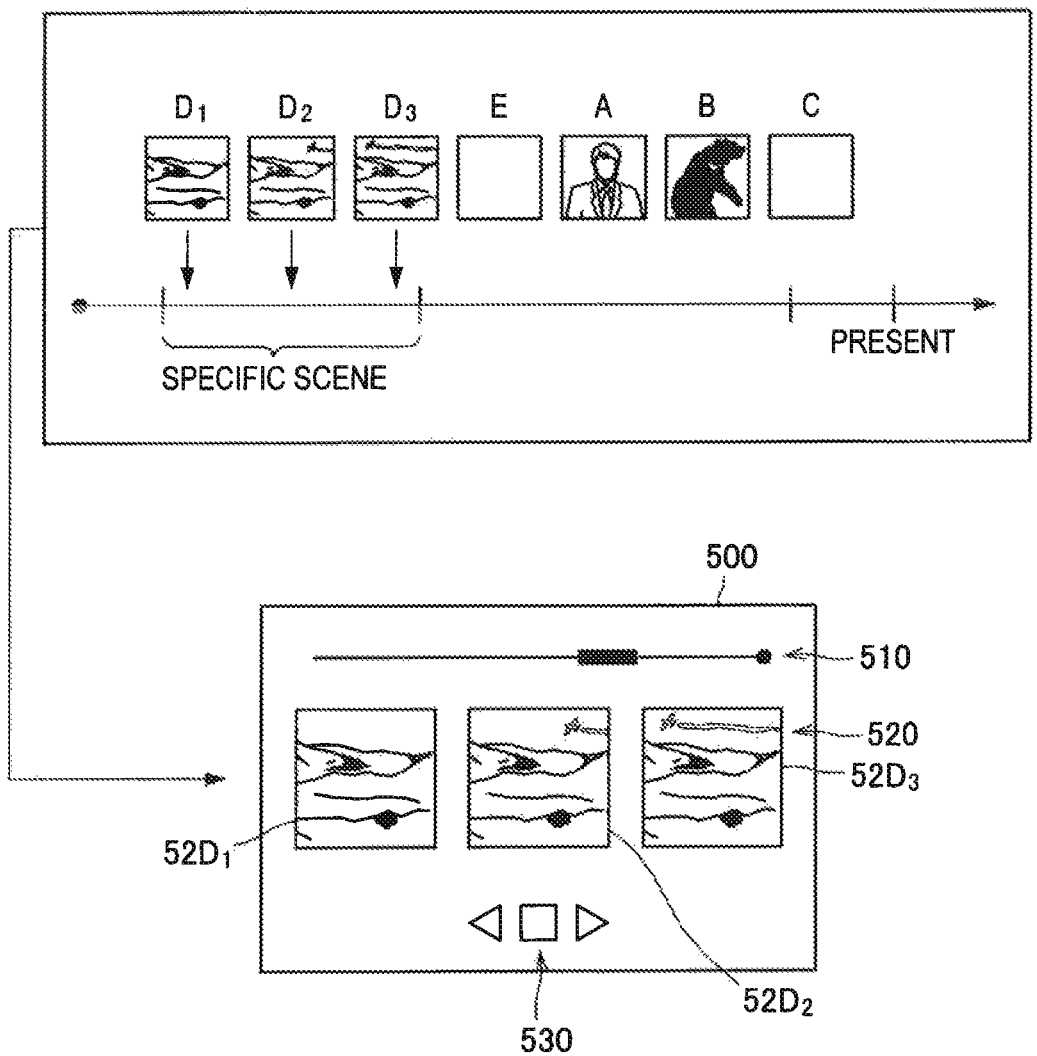

[Fig. 17]
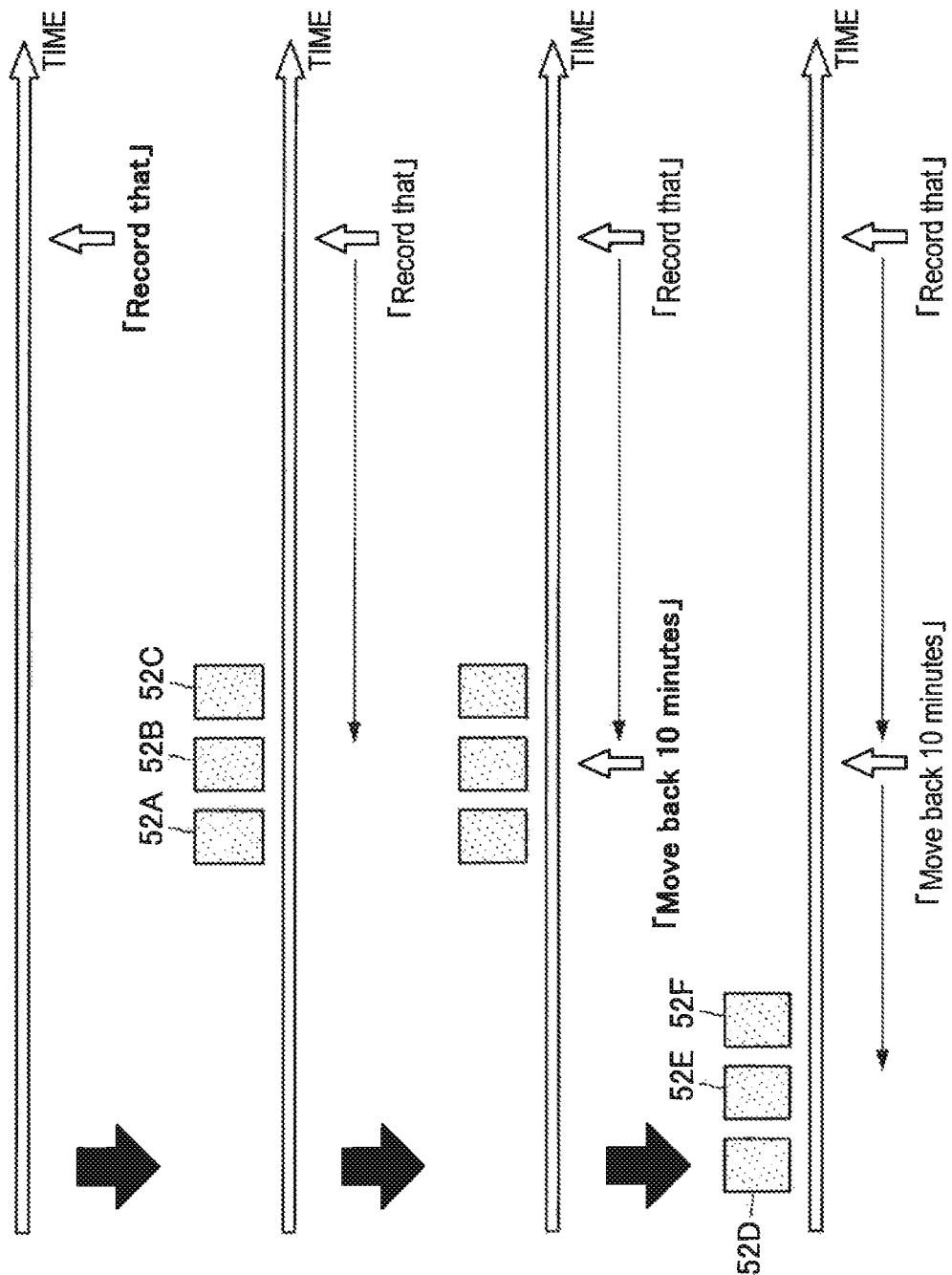

[Fig. 18]
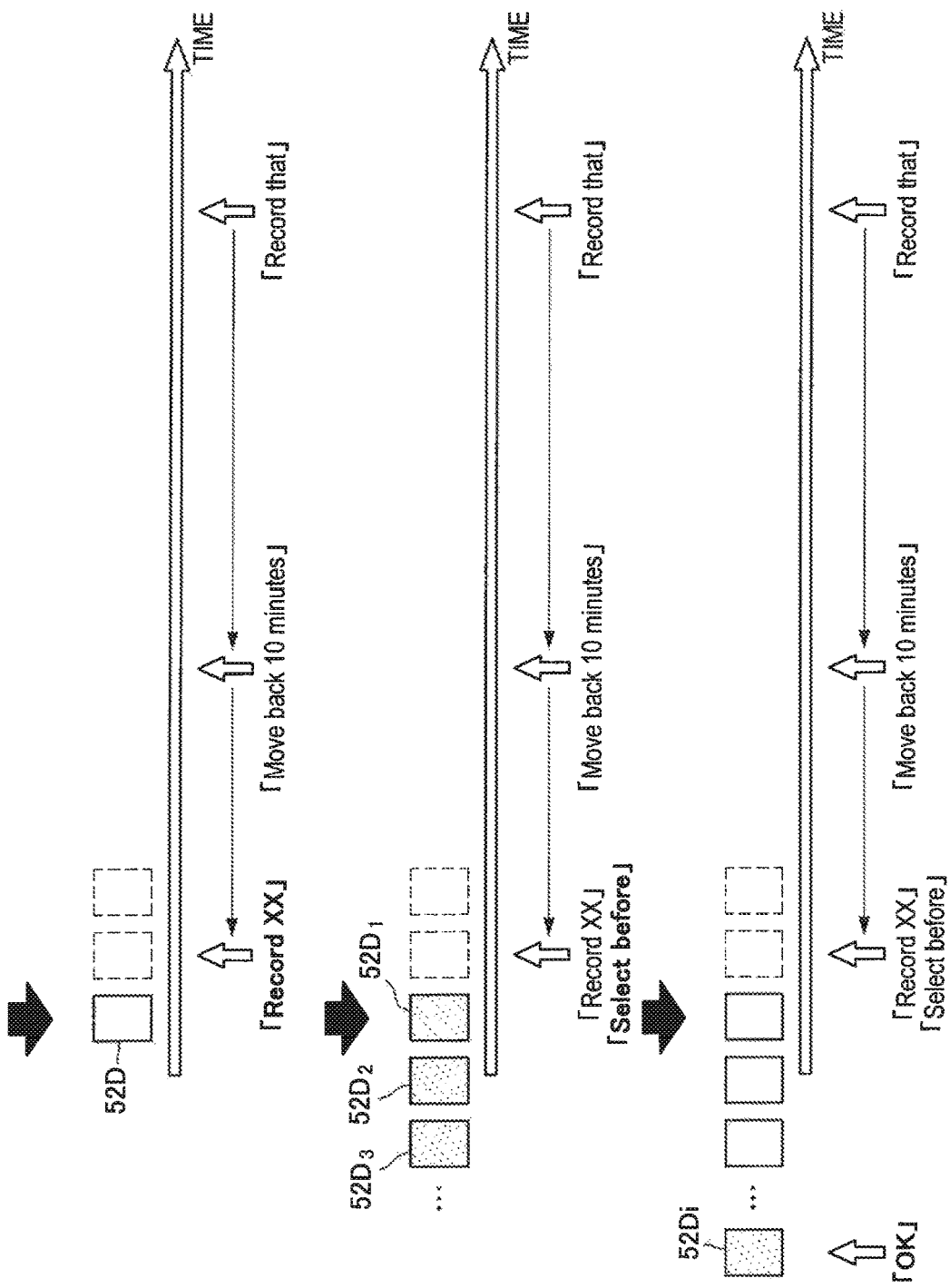

[Fig. 19]
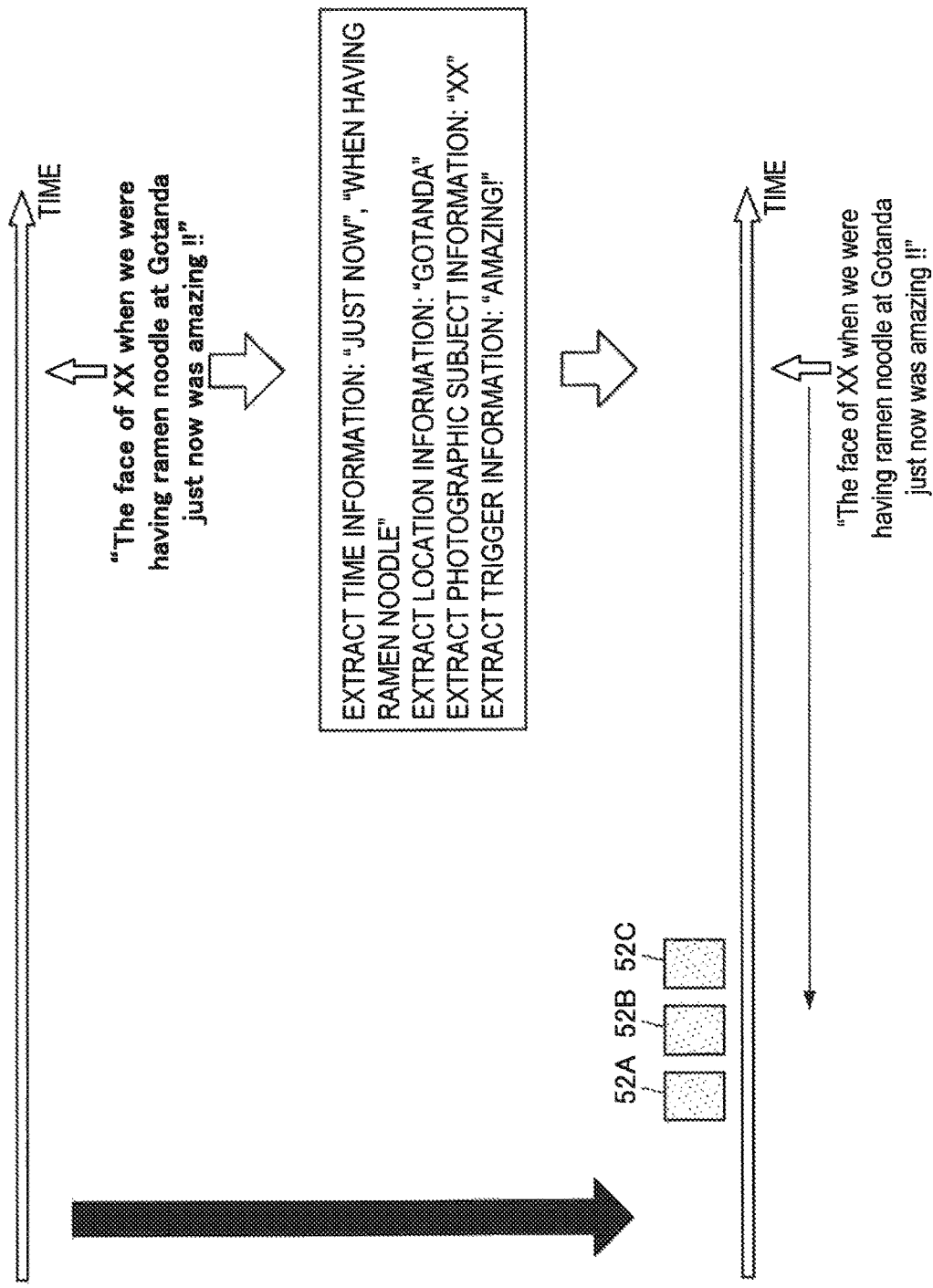

[Fig. 20]
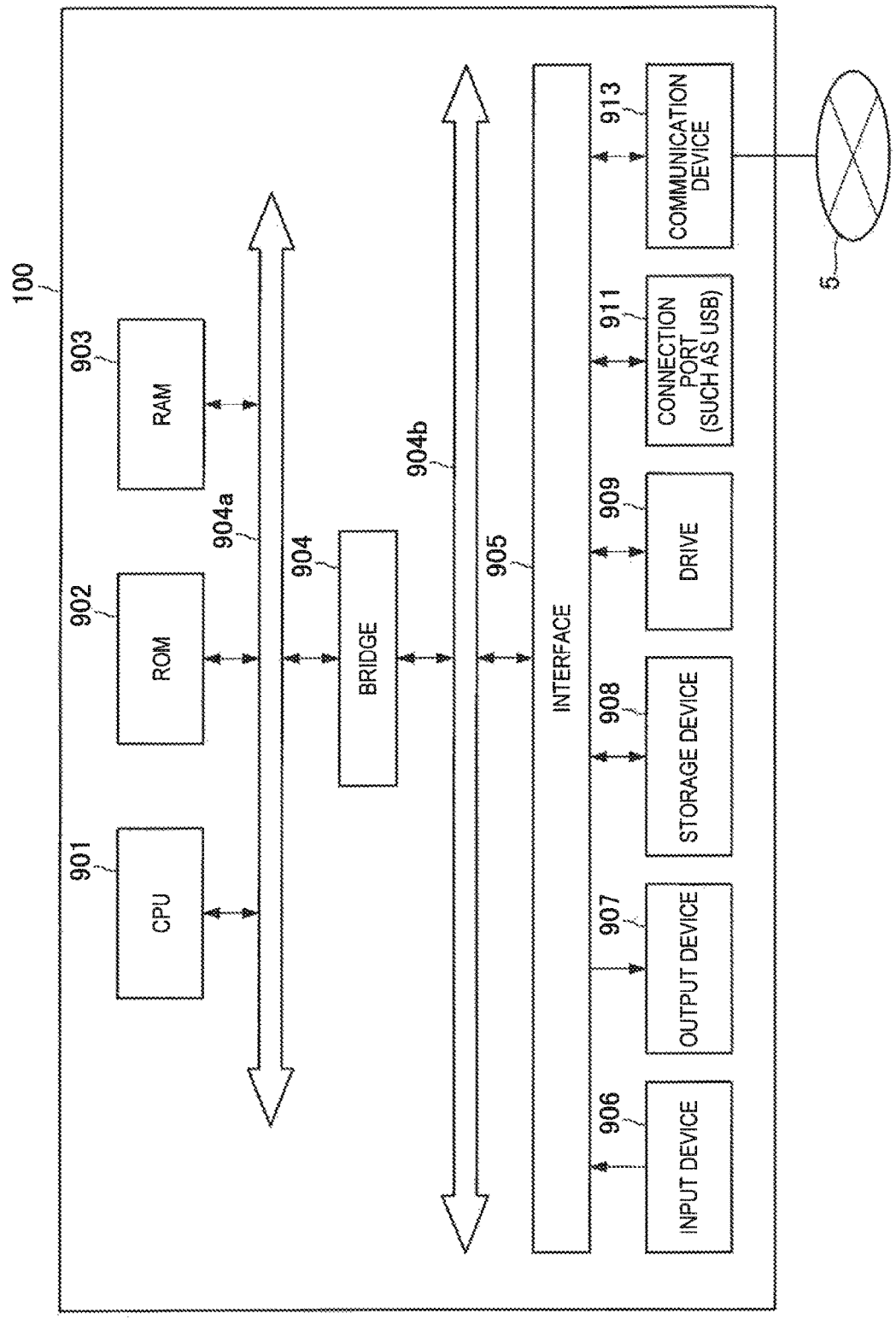

[Fig. 21]
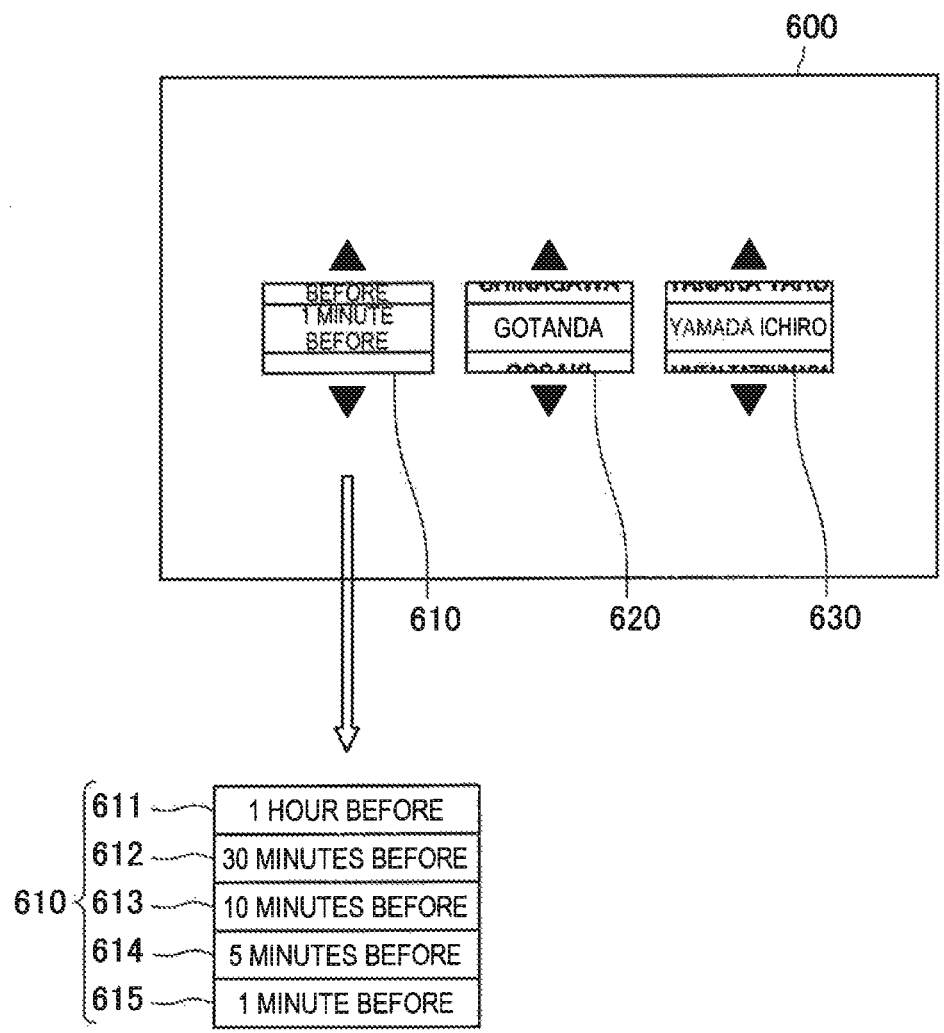

INFORMATION PROCESSOR, INFORMATION PROCESSING METHOD, AND PROGRAM

CROSS REFERENCE TO PRIOR APPLICATION

This application is a National Stage Application of PCT International Patent Application No. PCT/JP2015/002766 (filed on Jun. 1, 2015) under 35 U.S.C. § 371, which claims the benefit of Japanese Priority Patent Application JP 2014-118607 filed Jun. 9, 2014, the entire contents of which are incorporated herein by reference.

TECHNICAL FIELD

The present disclosure relates to an information processor, an information processing method, and a program.

BACKGROUND ART

In recent years, photographs and moving images are taken not only with imaging devices of the related art such as digital cameras, but also with cameras mounted, for example, on information communication terminals such as smart phones and on wearable terminals such as head mounted displays.

CITATION LIST

Patent Literature

PTL 1: US 2013/0044042A

SUMMARY

Technical Problem

Meanwhile, when viewing a moving image as well, in addition to using stationary displays and projectors, smart phones, tablet terminals, and the like, wearable terminals are becoming widely used. In particular, since shooting with a wearable terminal can be performed easily at any time, shooting is anticipated to be performed for a long period of time. Note that, due to the configuration of the device and the way the device is used, it is difficult to sufficiently provide a functional unit for inputting operation in the wearable terminal. Accordingly, when a lengthy moving image is viewed, it is anticipated that operation of specifying a desired moving image will be difficult. Accordingly, in wearable terminals and the like as well, a technique enabling the user to easily specify the desired image is awaited.

Solution to Problem

According to an embodiment of the present disclosure, there is provided an information processor including circuitry configured to identify a part of a moving image in response to an audible sound input of a user, wherein the moving image is generated by a capturing of an imaging unit which is attached to the user.

According to another embodiment of the present disclosure, there is provided an information processing method including: generating a moving image by a capturing of an imaging unit which is attached to a user; and identifying a part of the moving image in response to an audible sound input of the user.

According to another embodiment of the present disclosure, there is provided a non-transitory computer-readable medium having embodied thereon a program, which when executed by a computer causes the computer to execute a method, the method including: generating a moving image by a capturing of an imaging unit which is attached to a user; and identifying a part of the moving image in response to an audible sound input of the user.

According to an aspect of the present disclosure, by adding frame specifying information to a frame that has a high correlation with specific command information that has been set on the basis of a vocal sound and by recording the frame, the user can easily specify the desired image by using the frame specifying information.

Advantageous Effects of Invention

As described above, the present disclosure enables the user to easily specify the desired image. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory drawing illustrating an exemplary state of a user shooting a moving image.

FIG. 2 is a schematic perspective view illustrating an exemplary configuration of an imaging terminal that is held by the user to shoot a moving image.

FIG. 3 is a schematic perspective view illustrating an exemplary configuration of an imaging terminal that is worn by the user to shoot a moving image.

FIG. 4 is a functional block diagram illustrating a functional configuration of an imaging terminal and a server according to a first embodiment of the present disclosure.

FIG. 5 is a functional block diagram illustrating a functional configuration of a calculation unit of the server according to the first embodiment.

FIG. 6 is an explanatory drawing illustrating examples of the information recorded in the storage unit.

FIG. 7 is a flow chart illustrating specific frame information addition processing according to the first embodiment performed on a moving image by using vocal sound.

FIG. 8 is an explanatory drawing illustrating examples of specific commands and the contents that are extracted from image data with the specific commands.

FIG. 9 is an explanatory drawing for describing frame extraction processing performed with a specific command.

FIG. 10 is an explanatory drawing for describing location and person specification processing performed on a frame of the image data.

FIG. 11 is a flow chart illustrating specific frame information addition processing according to a second embodiment of the present disclosure performed on a moving image by using vocal sound.

FIG. 12 is an explanatory drawing illustrating specific command information and examples of the specific examples of the specific command information.

FIG. 13 is an explanatory drawing illustrating an example of a main window indicating an image that the user is viewing and a frame checking window according to a third embodiment of the present disclosure.

FIG. 14 is an explanatory drawing illustrating an exemplary configuration of the frame checking window.

FIG. 15 is an explanatory drawing illustrating a screen content when a starting point of a frame extraction is determined in the frame checking window.

FIG. 16 is an explanatory drawing illustrating a screen content when an ending point of the frame extraction is determined in the frame checking window.

FIG. 17 is an explanatory drawing illustrating specific actions taken when commanding with specific commands.

FIG. 18 is an explanatory drawing, continued from FIG. 17, illustrating the specific actions taken when commanding with the specific commands.

FIG. 19 is an explanatory drawing illustrating specific actions taken when commanding by vocal sound other than the specific command.

FIG. 20 is a hardware configuration diagram illustrating an example of a hardware configuration of the imaging terminal according to embodiments of the present disclosure.

FIG. 21 is an explanatory drawing illustrating an exemplary case in which the specific command information is set using a GUI.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
0. Overview
1. First Embodiment (Specific Command)
1.1. Acquisition of a moving image
1.2. Functional configuration
1.3. Specific frame information addition processing performed on a moving image by using vocal sound
2. Second Embodiment (Input of Freely Spoken Vocal Sound)
2.1. Specific frame information addition processing performed on a moving image by using vocal sound
3. Third Embodiment (Frame Specification Processing Performed by the User)
3.1. Frame specification processing performed by the user using a display
3.2. Specific examples
4. Exemplary Hardware Configurationl
   <0. Overview>

An overview of a function of an information processor according to an embodiment of the present disclosure will be described first. The information processor according to the present embodiment is a device that extracts, on the basis of specific command information that has been set on the basis of a vocal sound that has been input, a single or a plurality of frames that have a high correlation with specific command information that has been set in the moving image. Then, the information processor adds information (hereinafter, also referred to as "frame specifying information") serving as a tag to the extracted frame so that the frame can be easily specified later on. By addition of the frame specifying information, the desired moving image can be easily specified by using the frame specifying information when, for example, editing or viewing the image.

In such processing performed by the information processor, the specific command information is set on the basis of the input vocal sound. The specific command information includes a preset specific command and information obtained by analyzing a freely spoken vocal sound.

For example, when a specific command is set as the specific command information, the technique can be assumed to be used in the following circumstances
  a1) Shooting a moving image with an imagining terminal.
  b1) A user vocalizing a specific command (for example, "Record that"/"Record if XX").
  c1) A frame that corresponds to a specific command is extracted with the information processor (for example, extracting a frame that is a predetermined time back from when the specific command has been vocalized/extracting a frame of a scene in which Mr./Ms. XX has appeared).
  d1) Adding frame specifying information to the extracted frame with the information processor and recording the frame.
  e1) While editing the moving image or while creating a list of the scenes as a reminder, when the user wants to call the specified frame at a later time, the user uses the frame specifying information.

On the other hand, when the information obtained by analyzing the input vocal sound is set as the specific command information, the technique can be assumed to be used in the following circumstances.
  a2) Shooting a moving image with an imagining terminal.
  b2) The user speaks (for example, "By the way, that that was there just now was great!").
  c2) Extracting a frame, which corresponds to the input vocal sound, with the information processor (for example, specifying the relevant frame by interpreting words and phrases that indicate a content associated with time; place; and person, object, and the like that are concrete, such as "just now", "there", "that", and the like).
  d2) Adding the frame specifying information to the extracted frame with the information processor and recording the frame.
  e2) While editing the moving image or while creating a list of the scenes as a reminder, when the user wants to call the specified frame at a later time, the user uses the frame specifying information.

Hereinafter, a configuration and specific processing of the information processor provided with such a technique will be described in detail.

<1. First Embodiment>
(1.1. Acquisition of a Moving Image)

Referring to FIGS. 1 to 3, acquisition of a moving image that is processed by a device having a function of an information processor according to the present disclosure will be described first. Note that FIG. 1 is an explanatory drawing illustrating an exemplary state of a user shooting a moving image. FIG. 2 is a schematic perspective view illustrating an exemplary configuration of an imaging terminal 10 that is held by a user to shoot a moving image. FIG. 3 is a schematic perspective view illustrating an exemplary configuration of an imaging terminal 20 that is worn by a user to shoot a moving image.

The moving image that is processed by the device having the function of the information processor according to the present disclosure is not limited to a particular moving image, and in a case in which a lengthy moving image acquired by continuously and randomly taking a moving image with the imaging terminal is processed, the frame specifying information can be used more effectively. For example, the user illustrated in FIG. 1 is shooting a moving image by holding a first imaging terminal 10 in the hand and is also shooting a moving image by wearing a second imaging terminal 20 on the head. Furthermore, the user is shooting a moving image by attaching a third imaging terminal 30 to a bag on the back, and a camera 40 is provided on an eyewear worn by the user.

As illustrated in FIG. 2, in the first imaging terminal 10, a lens 12 is provided on an end face of a cylindrical housing 11, for example. Light incident on the lens 12 is formed into an image on an imaging element (not shown) provided inside the housing 11 and is converted into electric signals. A microphone 13 that acquires vocal sound is provided in the first imaging terminal 10 such that vocal sound can be acquired simultaneously while the moving image is shot. Other than the above, the first imaging terminal 10 includes, for example, an operation section 14 having a first button 14a, a second button 14b, and a power button 14c for operating the terminal; a display 15; a connection 16 for connecting the first image terminal 10 to other devices; and a communication unit (not shown) that transmits and receives information.

Furthermore, as illustrated in FIG. 3, for example, three lenses 22a, 22b, and 22c are provided on an upper portion and on a curved surface of a spherical housing 21 of the second imaging terminal 20. Imaging elements (not shown) each corresponding to one of the lenses 22a, 22b, and 22c are provided inside the housing 21; accordingly, images can be simultaneously shot in a plurality of directions. Furthermore, a microphone 23 that acquires vocal sound is provided in the second imaging terminal 20 such that vocal sound can be acquired simultaneously while the moving image is shot. Other than the above, the second imaging terminal 20 includes, for example, a power button 24, a connection 26 for connecting the second image terminal 20 to other devices, and a communication unit (not shown) that transmits and receives information.

Note that the third imaging terminal 30 may have a configuration similar to that of the first imaging terminal 10 or the second imaging terminal 20, or may be have a configuration different from the first imaging terminal 10 and the second imaging terminal 20. Furthermore, control of the terminals may be performed per terminal or may be performed through a server or another terminal that is communicatively connected to the terminals.

As described above, the user can shoot moving images simultaneously with the plurality of imaging terminals 10 to 30 and the camera 40. Furthermore, since the second imaging terminal 20, the third imaging terminal 30, and the camera 40 are used while being worn by the user, the user can, for example, keep on shooting moving images without directing any attention in operating the imaging terminals.

Note that when the user subsequently edits or views a moving image that has been shot for a long period of time, it will be more difficult for the user to find where the desired image is recorded as the shooting time of the moving image becomes longer. Accordingly, with a device having the function of the information processor according to the present disclosure, information serving as a tag is added to the shot moving image at a time position where the user might want to check later on. With the above, the user using the relevant information can easily specify the desired image later on.

(1.2. Functional Configuration)

Processing on a moving image that is performed by the device having the function of the information processor according to the present disclosure will be described next. In present embodiment, a description is given such that the function of the information processor according to the present disclosure is provided in the imaging terminal; however, a server, into which moving images that has been obtained by the imaging terminal is uploaded, may be provided with the function, for example. Exemplary functional configurations of an imaging terminal 100 and a server 200 will be described in FIG. 4.

(1) Imaging Terminal

The imaging terminal 100 according to the present embodiment is, for example, either one of the imaging terminals 10 to 30 and the camera 40 that are illustrated in FIG. 1. As illustrated in FIG. 4, the imaging terminal 100 includes an imaging unit 110, a vocal sound acquisition unit 120, a display 130, a controller 140, a calculation unit 150, a communication unit 160, a storage unit 170, and a battery 180. The imaging terminal 100 is supplied with drive power from the battery 180 and functions each of the functional units.

The imaging unit 110 is a functional unit that acquires image data and includes an imaging element, a lens, and the like. As the imaging element, for example, a charge coupled device (CCD) image sensor or a complementary metal oxide semiconductor (CMOS) image sensor may be used. The controller 140 records, in the storage unit 170, the image data acquired with the imaging element and through the lens.

The vocal sound acquisition unit 120 is a functional unit that acquires vocal sound data and, for example, a microphone or the like may be used. The vocal sound acquisition unit 120 is controlled by the controller 140 so as function in an interlocked manner with the imaging unit 110; accordingly, vocal sound data corresponding to the image data acquired by the imaging unit 110 can be acquired. The vocal sound acquisition unit 120 can function alone and, in such a case, the imaging terminal 100 only acquires vocal sound data. The controller 140 records, in the storage unit 170, the vocal sound data acquired with the vocal sound acquisition unit 120.

The display 130 is a functional unit that displays information and, for example, a liquid crystal display or an organic EL display may be used. Display of the display 130 is controlled by the controller 140 and the acquired image data, various setting screens of the imaging terminal 100, and the like are displayed on the display 130.

The controller 140 is a functional unit that controls the overall functions of the imaging terminal 100. The controller 140, for example, controls the imaging unit 110 and the vocal sound acquisition unit 120 and acquires image data and vocal sound data, and records the acquired image data and vocal sound data in the storage unit 170. Furthermore, the controller 140 transmits the image data and the vocal sound data recorded in the storage unit 170 to the server 200 through the communication unit 160. Furthermore, the controller 140 executes arithmetic processing to add frame specifying information to the image data, other various kinds of arithmetic processing, management of the battery 180, and the like.

Various pieces of information processed by the controller 140 may be transmitted to the server 200 after being buffered in the storage unit 170 of the imaging terminal 100. Furthermore, the controller 140 may have the image data be transmitted to the server as necessary when the image data is a moving image. In such a case, the controller 140 may, among the image data stored in the storage unit 170, delete the recorded contents taken before a predetermined period of time set in advance. With the above, cases in which the recording capacity of the storage unit 170 of the imaging terminal 100 is compromised can be reduced.

The calculation unit 150 is a functional unit that performs various kinds of arithmetic processing in the imaging terminal 100. Receiving a command from the controller 140, the calculation unit 150 executes arithmetic processing and returns a calculation result to the controller 140. At this point, the calculation unit 150 of the imaging terminal 100 according to the present embodiment executes arithmetic processing for adding frame specifying information to the image data. Accordingly, as illustrated in FIG. 5, the calculation unit 150 includes a specific command information extraction unit 152, a frame extraction unit 154, and the frame specifying information addition unit 156.

The specific command information extraction unit 152 analyzes the vocal sound data and extracts specific command information. The specific command information is information used to extract an image (frame) in the image data that the user would like to check later on. In the present embodiment, a preset specific command is extracted as the specific command information. The specific command is, for example, pre-stored in the storage unit 170. The specific command information extraction unit 152 extracts the specific command from the vocal sound data and outputs the vocal sound data to the frame extraction unit 154.

The frame extraction unit 154 extracts a single or a plurality of frames correlated with the specific command information from the image data. Herein, the frame correlated with the specific command information is, for example, a frame that is 10 minutes long when a vocal sound command "10 minutes before" is input as the specific command information. For example, when the vocal sound command is related to a location and a person, the frame extraction unit 154 may quantify the degree of correlation of the location and the person. In such a case, the frame extraction unit 154 can determine how high the correlation is on the basis of a predetermined threshold set in advance. The frame extraction unit 154 extracts, from the image data, a frame that has a strong relationship with the content that has been designated by the specific command serving as the specific command information and outputs the frame to the frame specifying information addition unit 156.

The frame specifying information addition unit 156 adds the frame specifying information to the frame, which has been extracted by the frame extraction unit 154, for specifying the frame. The frame specifying information is information that specifies the time position of the image (the frame), which the user would like to check later on, in the image data. The controller 140 records, in the storage unit 170, the image data to which the frame specifying information has been added by the frame specifying information addition unit 156.

The controller 140 and the calculation unit 150 are functional units that have the function of the information processor according to an embodiment of the present disclosure and are each implemented with a CPU, for example.

Referring back to FIG. 4, the communication unit 160 is a functional unit that transmits and receives information to and from a server or the like that is communicatively connected thereto via, for example, a network or a cable. The communication unit 160 of the imaging terminal 100 transmits image data and vocal sound data that have been recorded in the storage unit 170 to the server 200. Furthermore, the imaging terminal 100 may receive various kinds of information from the server 200 through the communication unit 160.

The storage unit 170 stores image data and vocal sound data that have been acquired by the imaging unit 110 and the vocal sound acquisition unit 120. In a case in which the image data and the vocal sound data are acquired at the same time, the image data and the vocal sound data are stored while being associated with each other. For example, as illustrated in FIG. 6, other than a moving image file of the image data acquired by the imaging unit 110 and a vocal sound file of the vocal sound data acquired by the vocal sound acquisition unit 120, the information recorded in the storage unit 170 includes a metadata file, frame specifying information, external information, and the like.

The metadata file includes information at the time when the image data had been acquired such as GPS positional information and the recording time, scene information acquired by analyzing the image data, information related to the content of the image data such as face recognition information, and the like. The frame specifying information is information added for specifying a predetermined frame in the image data and includes, for example, marking information indicating that the frame is a specified frame, mark command time information that is the clock time in which the marking information had been added, and the like. Furthermore, the frame specifying information may include accuracy information that indicates the degree of interest the user has towards the content of the frame and information indicating the degree of correlation between the specific command information and the specified frame. Furthermore, information acquired through external services such as check-in information and the like provided by an SNS service may be stored as external information.

Furthermore, the storage unit 170 stores, in the calculation unit 150, data and the like that are necessary for adding the frame specifying information to the image data. Data used by the calculation unit 150 includes the specified command and the like. The specific command is information that is pre-stored in the storage unit 170; however, the specific command may be updated as necessary. Note that the image data and the vocal data, and pre-stored information such as the specific command may be stored in a separate storage medium. The data stored in the storage unit 170 may be transmitted to the server 200 with the controller 140 through the communication unit 160.

(2) Server

The server 200 is an information processor that manages image data acquired with the imaging terminal 100 and holds the image data and the vocal sound data received from the imaging terminal 100. As illustrated in FIG. 4, the server 200 includes a communication unit 210, a controller 220, a calculation unit 230, and a storage unit 240.

The communication unit 210 is a functional unit that transmits and receives information to and from the imaging terminal 100 and the like that is communicatively connected thereto via, for example, a network or a cable. The communication unit 210 of the server 200 receives image data and vocal sound data from the imaging terminal 100 and notifies the controller 220. Furthermore, the server 200 may transmit various kinds of information to the imaging terminal 100 through the communication unit 210.

The controller 220 is a functional unit that controls the overall functions of the server 200. The controller 220 records the image data and the vocal sound data received from the imaging terminal 100 in the storage unit 240, for example. Furthermore, the controller 220 makes the calculation unit 230 execute various kinds of arithmetic processing.

The calculation unit 230 is a functional unit that performs various kinds of arithmetic processing in the server 200. Receiving a command from the controller 220, the calculation unit 230 executes arithmetic processing and returns a calculation result to the controller 220. The controller 220 and the calculation unit 230 are functional units and are each implemented with a CPU, for example. Note that when the server 200 side includes the functional units having the functions of the information processor according to an embodiment of the present disclosure, the calculation unit 230 will include the specific command information extraction unit, the frame extraction unit, and the frame specifying information addition unit that are described above. The storage unit 240 stores image data and vocal sound data.

Note that when the server 200 side includes the functional units having the functions of the information processor according to an embodiment of the present disclosure, data, such as the specific command, necessary to add frame specifying information to the image data in the calculation unit 230 is stored in the storage unit 240 as well.

(1.3. Specific Frame Information Addition Processing on the Moving Image by Using Vocal Sound)

Referring to FIGS. 6 to 9, specific frame information addition processing according to the present embodiment performed on a moving image by using vocal sound with the imaging terminal 100 will be described. Note that FIG. 6 is an explanatory drawing illustrating examples of the information recorded in the storage unit. FIG. 7 is a flow chart illustrating the specific frame information addition processing according to the present embodiment performed on a moving image by using vocal sound. FIG. 8 is an explanatory drawing illustrating examples of specific commands and the contents that are extracted from the image data with the specific commands. FIG. 9 is an explanatory drawing for describing frame extraction processing performed with a specific command.

The timing to start the specific frame information addition processing performed on a moving image by using vocal sound is when acquisition of the moving image is performed with the imaging terminal 100, for example. When the imaging unit 110 starts shooting a moving image, the calculation unit 150 receives a command from the controller 140, analyzes the vocal sound data with the specific command information extraction unit 152, and extracts a specific command (S100). In step S100, the specific command information extraction unit 152 extracts a specific command that is stored in the storage unit 170 from the vocal sound data.

Examples of the specific commands are illustrated in FIG. 8. In the examples illustrated in FIG. 8, for example, by using a specific command "Record . . . ", designation of the time position of the frame that the user wants to extract or a specific person, object, location, and the like that is to be extracted can be designated. At this point, the specific command information extraction unit 152 checks at least the content of the vocal sound succeeding "Record" and recognizes, from the image data, the content that has been designated by the relevant specific command. Furthermore, there are other specific commands such as "Stop record" that stops the preceding specific command. The specific commands may include commands relating to the manner in which the frame is specified, the operation of the device, and the like, such as "Capture", "Reproduce", "Move", and "Select".

The specific command information extraction unit 152 continues the analysis of the vocal sound data until a specific command is extracted from the vocal sound data (S110). Then, when a specific command is extracted, a frame including information that is correlated to the specific command is extracted from the image data by the frame extraction unit 154 (S120).

For example, when time information is input as the specific command, the frame corresponding to the designated time information is extracted. As a specific example, a case in which a specific command "Record that" is input is considered. With an input of the specific command "Record that", the frame extraction unit 154 performs frame extraction from the present point to an earlier point or performs frame extraction of the earlier point. In other words, as illustrated in FIG. 9, while having a predetermined time, which corresponds to the "earlier point" set in advance, as a base point, the frame extraction unit 154 extracts a frame of a predetermined time (period A) from before the base point to after the base point or a frame having a period (period B) from after the base point to the present.

In other words, for example, when the predetermined time corresponding to the "earlier point" is 10 minutes and the time before and after the base point serving as a reference is 10 minutes, 10 minutes before the issuance of the specific command is set as the base point, and a frame having a period from 5 minutes before to 5 minutes after the base point or a frame having a period from 10 minutes before to the present is extracted. Alternatively, the frame extraction unit 154 may continuously set the frame after the base point as an extraction target (period C) until there is a command. The predetermined time corresponding to the "earlier point" and the time before and after the base point serving as a reference may be set optionally.

Furthermore, for example, when a location or a photographic subject, such as a person or an object, is designated as the specific command, the frame extraction unit 154 extracts a frame on the basis of additional information added to the image data in advance, estimated information obtained as a result of machine learning, or the like. The additional information added to the image data in advance includes, for example, positional information (GPS positional information when the moving image had been acquired, check-in information provided from an SNS service, and the like) and person information matched with a preregistered face image. By using such additional information, a frame of the image data that includes locations or a photographic subject designated by the user can be extracted. The additional information may be information that has been acquired from another device or a service and that has been synchronized.

For example, assume that Gotanda station has been designated with a vocal sound command "Record Gotanda station". At this point, as illustrated in FIG. 10, the frame extraction unit 154 extracts a frame having high correlation with Gotanda station by performing recognition of the character information included in the signboard 310 of Gotanda station in the image data or by performing a matching process with the preregistered image information of Gotanda station. Alternatively, the frame extraction unit 154 may extract a frame that has a correlation with Gotanda station in accordance with the distance with Gotanda station. In other words, the degree of correlation is expressed by a distance with the designated subject. For example, the frame extraction unit 154 determines that the frame that has been acquired within a predetermined range with respect to Gotanda station is a frame that has a correlation with Gotanda station, and extracts the frame.

Furthermore, assume that Gotanda station has been designated with the vocal sound command "Record Mr./Ms. XX". At this point, the frame extraction unit 154 preforms matching between a face image of Mr./Ms. XX that has been registered in advance and the face images that has been recognized in the each of the frames of the image data and, as illustrated in FIG. 10, specifies the frame including a face image 320 of Mr./Ms. XX.

Furthermore, as the additional information, information such as schedule information, activity information related to the action of the user that has been collected with a log collection terminal, and action recognition information obtained by performing action recognition processing on the activity information may be used. Furthermore, scene (environment) information while taking a moving image during shopping and while going for a drive may be added to the image data as the additional information. Scene information is information that is generated while determining the possibility of change in the scene on the basis of, for example, change in the moving image that has been taken and change in the additional information. The scene information allows, for example, extraction of a frame of a specific scene designated by the vocal sound and extraction of a frame in a case in which the scene has changed. Furthermore, a frame that is to be extracted may be specified by a gesture of the user. For example, when a photographic subject that is the present shooting object is recorded, upon confirming that the user has performed a gesture of pointing a finger to the photographic object, the frame extraction unit 154 extracts a frame including the photographic subject.

When the frame that includes information corresponding to the specific command is extracted from the image data with the frame extraction unit 154, the frame specifying information addition unit 156 adds frame specifying information to the extracted frame (S130). The frame specifying information is information that is recorded while being associated with the image data to facilitate specification of the extracted frame performed subsequently. The addition of the frame specifying information allows the user will to easily specify the desired frame subsequently using the frame specifying information. The frame specifying information includes information of a frame that is to be specified and, for example, includes information such as marking information indicating that the frame is a specified frame and mark command time information that is the time when the marking information has been added. The marking information may be information such as a flag that is represented by "0" or "1", for example. Note that the frame specifying information does not have to be recorded at the same time as the recording of the frame.

Note that the frame to which the frame specifying information is added is the frame that has been estimated and extracted in the processing in step S120. Accuracy information indicating the degree of interest the user has on the extracted frame, in other words, the extent to which the user would like to view the information of the frame later on, may be included in the frame specifying information. The accuracy information may be determined on the basis of the correlation between the vocal sound command and each of the frames of the moving image, for example. By including the accuracy information in the frame specifying information, only the frames to which the user showed strong interest may be specified with the accuracy information when the user subsequently searches the desired frame using the frame specifying information.

The processing in step S110 to S130 is repeatedly performed, for example, until shooting performed by the imaging unit 110 ends (S140). When the controller 140 stops shooting performed by the imaging unit 110, the controller also ends the processing of adding the frame specifying information to the image data.

The specific frame information adding processing according to the first embodiment performed on a moving image by using vocal sound has been described above. In the present embodiment, the specific command is specified from the vocal sound data as the specific command information, the frame that has high correlation with the information designated by the specific command is extracted from the image data, and the frame specifying information is added to the frame. With the above, the user can, later on, easily specify the desired frame by using the frame specifying information. For example, the user can specify, playback, and view the frame corresponding to the frame specifying information or the frame a predetermined time before and after the frame corresponding to the frame specifying information.

<2. Second Embodiment>

Referring next to FIGS. 11 to 12, specific frame information addition processing according to a second embodiment of the present disclosure performed on a moving image by using vocal sound will be described. The processing according to the present embodiment is different from that of the first embodiment in that the specific command information used to extract a frame is set based on vocal sound data spoken freely by the user. Hereinafter, the specific frame information adding processing according to the second embodiment performed on a moving image by using vocal sound will be described, mainly on the differences with the first embodiment. Note that the configurations of the imaging terminal 100 and the server 200 are similar to those illustrated in FIG. 4; accordingly, the description thereof are omitted herein.

(2.1. The Specific Frame Information Addition Processing Performed on a Moving Image by Using Vocal Sound)

Referring to FIGS. 11 and 12, the specific frame information addition processing according to the present embodiment performed on a moving image by using vocal sound with the imaging terminal 100 will be described. Note that FIG. 11 is a flow chart illustrating the specific frame information addition processing according to the present embodiment performed on a moving image by using vocal sound. FIG. 12 is an explanatory drawing illustrating specific command information and examples of the specific examples of the specific command information.

The timing to start the specific frame information addition processing according to the present embodiment performed on a moving image by using vocal sound is also when acquisition of the moving image is performed with the imaging terminal 100, for example. When the imaging unit 110 starts shooting a moving image, the calculation unit 150 receives a command from the controller 140, analyzes the vocal sound data with the specific command information extraction unit 152, and extracts the specific command information (S200). In step S200, the specific command information extraction unit 152 analyzes the speech content of the user that has been acquired as vocal sound data, ambient sound, and the like and extracts a vocal sound content that is to become the specific command information.

Examples of the vocal sound contents that are to become the specific command information are illustrated in FIG. 12. As illustrated in FIG. 12, the specific command information includes, for example, time, location, photographic subject, action, circumstance, and vocal sound that becomes a trigger. Note that time includes quantitative information such as "x minutes ago" and non-quantitative information such as "just now". Regarding non-quantitative information, a predetermined time width may be preset to the non-quantitative information and the frame to be extracted may be designated on the basis the predetermined time width. Regarding location and photographic subject, corresponding explicit information may be set in advance for the non-quantitative information.

Furthermore, regarding action, the image data may be analyzed by also referring to the additional information, such as "walked", "ran", "on a train", and "slept", to extract vocal sound content that indicates a recognizable behavior. Regarding circumstance, vocal sound content that indicates a circumstance that can be specified is extracted from, for example, the scene information, such as "rain is falling", and "having a meal".

Meanwhile, apart from the information such as time, location, person, and action described above related to "which frame is to be specified", the specific command information also includes start determination information for determining "whether to start specifying the frame". The start determination information is information that sets, in a binary manner (should, should not), whether to perform processing of specifying the frame upon receiving a vocal sound, such as those illustrated in FIG. 12, for example, that becomes a trigger. Accordingly, the specific command information extraction unit 152 makes the frame extraction unit 154 execute the frame specifying processing only when a speech of the user that is associated with the information "should start specification of the frame" is detected. The specific command information extraction unit 152 extracts such vocal sound as specific command information because the frame extraction unit 154 starts specification of the frame after determining that the user has interest on the basis of vocal sound that becomes a trigger. Such vocal sound contents that are extracted with the specific command information extraction unit 152 are preset in the storage unit 170.

The specific command information extraction unit 152 continues analyzing the vocal sound data until a vocal sound content that becomes specific command information is extracted from the vocal sound data (S210). Then, when a vocal sound content that becomes specific command information is extracted, the specific command information extraction unit 152 sets a specific extraction target that is designated by the vocal sound content (S220). As described above, since non-quantitative information is also included in the vocal sound content, the vocal sound content as it is does not allow the frame corresponding to the vocal sound content to be appropriately specified from the image data. Accordingly, as regards the extracted vocal sound content that does not, if an it is, allow the frame to be extracted therefrom, the specific command information extraction unit 152 acquires explicit information corresponding to the preset non-quantitative information from the storage unit 170 so as to make the extraction target explicit.

Then, a frame including information corresponding to the vocal sound content is extracted from the image data with the frame extraction unit 154 (S230). Upon receiving the start determination information, the frame extraction unit 154 starts specification of the frame. Regarding the start determination information, the vocal sound that becomes a trigger that has been extracted in step S200 or a behavior estimation result of the user such as, for example, the user coming to a stop or the user gazing for a certain time, may be used. The frame extraction unit 154 determining that the user has interest on the basis of the behavior estimation result of the user may start specification of the frame. Similar to the first embodiment, the extraction of the frame including information corresponding to the vocal sound content is performed by analyzing the image data. Furthermore, the additional information added to the image data may be referred to as necessary to extract the frame from the image data.

When the frame that includes information corresponding to the specific command is extracted from the image data with the frame extraction unit 154, the frame specifying information addition unit 156 adds the frame specifying information to the extracted frame (S240). The addition of the frame specifying information allows the user to, later on, easily specify the desired frame by using the frame specifying information. The accuracy information may be included in the frame specifying information.

The processing from step S210 to S240 is repeatedly performed, for example, until shooting performed by the imaging unit 110 ends (S250). When the controller 140 stops shooting performed by the imaging unit 110, the controller also ends the processing of adding the frame specifying information to the image data.

The specific frame information adding processing according to the second embodiment performed on a moving image by using vocal sound has been described above. In the present embodiment, the speech content of the user included in the vocal sound data and the predetermined vocal sound content included in the ambient vocal sound are specified as the specific command information, the frame that has high correlation with the information designated by the vocal sound content is extracted from the image data, and the frame specifying information is added to the frame. With the above, the user can, later on, easily specify the desired frame by using the frame specifying information.

Note that in the present embodiment, a case in which the speech content of the user included in the vocal sound data and the predetermined vocal sound content included in the ambient vocal sound are used as the specific command information is described; however, in addition to the above information, the specific commands used in the first embodiment may be included as well.

<3. Third Embodiment>

(3.1. Frame Specification Processing Performed by the User Using a Display)

In the embodiment described above, the specific command information is set on the basis of the vocal sound data and the frame specifying information is set by extracting a frame that has a high correlation with the specific command information. At this point, the frame specifying information may be allowed to be set while the user checks the content of the frame. Hereinafter, referring to FIGS. 13 to 16, frame specification processing according to a third embodiment of the present disclosure performed by the user using a display will be described. FIG. 13 is an explanatory drawing illustrating an example of a main window 400 indicating an image that the user is viewing and a frame checking window 500. FIGS. 14 to 16 are explanatory drawings illustrating the frame specification processing performed by the user using the frame checking window 500.

For example, assume that the user is wearing a wearable terminal, such as a head mounted display, and is viewing the external image taken by a camera as a through image. The through image is recorded as well. In such a state, when the processing according to the embodiment described above is applied, by speaking a specific command or the like, the user will be able to add frame specifying information to the image data of the through image being recorded. Furthermore, in the present embodiment, a screen for setting the frame to which the frame specifying information is added may be displayed so as to allow the user to set the frame.

The controller 140 receiving a command from the user displays the frame checking window 500 in a portion of the main window 400 on which the through image is displayed. The user may use the specific commands illustrated in FIG. 8, for example, when issuing a command that displays the frame checking window 500 through the vocal sound of the user. The frame checking window 500 is, as illustrated in FIG. 13, displayed in a partial area on the upper left of the main window 400, for example. The frame checking window 500 is displayed with a size that does not greatly disturb display of the through image, for example.

When the frame checking window 500 is displayed, the user commands, for example, through vocal sound, display of candidate scenes including the frames to which the frame specifying information is to be added. The controller 140 receiving the command from the user makes the calculation unit 150 extract relevant candidate scenes from the image data and displays some of the frames included in the candidate scenes in the frame checking window 500 of a display 160. For example, when the user commands display of a scene 10 minutes before the present, for example, as illustrated in FIG. 14, a scene within a predetermined time having 10 minutes before the present as the base point is specified from the image data. Then, a thumbnail group 520 formed of thumbnails 52A to 52C of the representative frames of the scenes are displayed in the frame checking window 500.

The thumbnails displayed in the frame checking window 500 may be, other than the representative frames in the scene, a plurality of thumbnails generated by time division of the scene, thumbnails of the starting point and the ending point of the scene, or the like.

Furthermore, as illustrated in FIG. 14, a timeline indicator 510 and a selection operation object 530, and the like are displayed in the frame checking window 500. A timeline 512 indicating the time base and a bar 514 indicating the position of the scene in the overall image data are displayed in the timeline indicator 510. The selection operation object 530 includes a first object 532 for moving the specific scene to the past, a second object 534 for moving the specific scene towards the present, and an addition object 536 for adding frame specifying information.

The user is capable of changing the position of the specific scene and the length of the specific scene, for example, by the "Move" command described above or by operating the selection operation object 530 by the line of sight. For example, when an operation of moving to a scene of the past from the scene specified in FIG. 14 is performed, as illustrated in FIG. 15, a scene that has been shot a predetermined time further in the past is specified, and the thumbnails 52D to 52F of the specified scene are displayed.

Furthermore, after the user selects the thumbnails corresponding to the frames to which frame specifying information is to be added by operating the selection operation object 530 by vocal sound or by line of sight, when the addition object 536 is selected, the frame specifying information is added to the frame corresponding to the thumbnails. For example, in the example in FIG. 15, the thumbnail 52D is selected, and, at this time, a selection frame is added to the thumbnail 52D so that the selected state can be seen. When the addition object 536 is selected in the above state, the frame specifying information is added to the frame corresponding to the thumbnail 52D. Furthermore, in the above case, a message for selecting the starting point of the scene may be displayed to make the user select whether a frame of a predetermined period including a certain scene is to be selected.

Note that when the length of the specific scene displaying the thumbnail group is changed, the displayed content of the thumbnail constituting the thumbnail group 520 is also changed in accordance with the length of the newly set specific scene. For example, as illustrated in FIG. 16, when the length of the specific scene is shortened, the thumbnails $52D_1$ to $52D_3$ constituting the thumbnail group 520 can be displayed in detail as if advanced frame-by-frame. With the above, the position where the frame specifying information is to be added can be specified accurately.

When the user inputs a command to add the frame specifying information, the controller 140 associates the frame specifying information with the image data and records the frame in the storage unit 170.

The frame specification processing according to the third embodiment performed by the user using a display has been described above. With the frame specification processing according to the present embodiment, the user can accurately add the frame specifying information to the intended frame. Note that the frame specification processing according to the present embodiment performed by the user using a display may be applied while being combined with the processing of the first embodiment or the second embodiment described above. With the above, the user can perform correction on the basis of the frame that has been specified automatically to which frame specifying information is to be added; accordingly, the operation load of the user is reduced.

3.2. Specific Examples (1) Specific Action Taken when Commanding with the Specific Command As a specific example of the processing according to the third embodiment, referring to FIGS. 17 and 18, a specific action taken when commanding with a specific command will be described first. In the present example, a case in which a frame is extracted with time and person will be described.

As illustrated in FIG. 17, it is assumed that a specific command "Record that" is first input by vocal sound. Upon receiving input of such a vocal sound, the calculation unit 150 automatically detects a scene based on 15 minutes before, which has been set as a predetermined time corresponding to "that", and displays the representative thumbnails 52A to 52C on the frame checking window 500. Note that the number of thumbnails displayed can be set optionally. Next, it is assumed that the user inputs a specific command "Move back 10 minutes" by vocal sound. Upon reception of the above, the calculation unit 150 displays the representative thumbnails 52D to 52F of the scene 10 minutes further back.

Subsequently, as illustrated in FIG. 18, it is assumed that a specific command "Record Mr./Ms. XX" is input by vocal sound. Upon receiving input of such a voice command, the calculation unit 150 extracts the thumbnail 52D associated with Mr./Ms. XX. Then, when a specific command "Select before" is input by vocal sound, the calculation unit 150 sequentially displays the thumbnails $52D_1$, $52D_2$, $52D_3$, . . . of the past from the thumbnail 52D until there is a command. Subsequently, when the anticipated thumbnail $52D_1$ appears and when the user inputs a specific command "OK", then the calculation unit 150 adds the frame specifying information to the frame corresponding to the thumbnail $52D_1$ and records the frame.

(2) Specific Action Taken when Commanding by Vocal Sound Other than the Specific Command As a specific example of the processing according to the third embodiment, referring to FIG. 19, a specific action taken when commanding by vocal sound other than the specific command will be described.

As illustrated in FIG. 19, it is assumed that the user, for example, says, "The face of XX when we were having ramen noodle at Gotanda just now was amazing!!". Based on the above vocal sound, the calculation unit 150 extracts the following vocal sound contents as specific command information.

Time information: "just now", "when having ramen noodle"
Location information: "Gotanda"
Photographic subject information: "XX"
Trigger vocal sound information: "amazing!!"

The calculation unit 150 having the extracted vocal sound content as specific command information specifies a scene that includes the content from the image data. The specification of the scene is performed by setting the specific command information as the following extraction conditions, for example.

Time information: "just now", "when having ramen noodle"
"just now": for example, until 3 hours before is prioritized, and if not found, searching before that also
"when having ramen noodle": prioritizing before and after the frame in which the ramen noodle has appeared
Location information: "Gotanda"
"Gotanda": using GPS information that is positional information or by image recognition
recognition of the building and signboard in the image, and prioritizing the frame that has been shot at Gotanda
Photographic subject information: "XX"
"XX": specifying a scene having person XX therein with face recognition Subsequently, analyzing the frame in the specified scene to extract candidates that correspond to the trigger vocal sound information "amazing!!" and specifying a single or a plurality of thumbnails 52A to 52C that have an object that is anticipated to be "amazing!" therein. In the present embodiment, the thumbnails 52A to 52C are displayed in the frame checking window 500. Then, when the user selects a thumbnail and inputs a specific command "OK", the calculation unit 150 adds the frame specifying information to the frame corresponding to the selected thumbnail and records the frame.

<4. Exemplary Hardware Configuration>

Last of all, exemplary hardware configurations of the imaging terminal 100 and the server 200 according to embodiments will be described. Since the devices can be configured in a similar manner, herein, description of the imaging terminal 100 will be given as an example. FIG. 20 is a hardware configuration diagram illustrating a hardware configuration of the imaging terminal 100 according to embodiments.

As described above, the imaging terminal 100 according to embodiments can be implemented with a processing device such as a computer. As illustrated in FIG. 20, the imaging terminal 100 includes a central processing unit (CPU) 901, read only memory (ROM) 902, random access memory (RAM) 903, and a host bus 904a. Furthermore, the imaging terminal 100 includes a bridge 904, an external bus 904b, an interface 905, an input device 906, an output device 907, a storage device 908, a drive 909, a connection port 911, and a communication device 913.

The CPU 901 functions as an arithmetic processing unit and a controller and controls the overall operation in the imaging terminal 100 according to various programs. Furthermore, the CPU 901 may be a microprocessor. The ROM 902 stores programs, operation parameters, and the like that the CPU 901 uses. The RAM 903 temporarily stores programs used in the execution of the CPU 901 and the parameters and the like that appropriately changes during the execution. The above are interconnected with a host bus 904a constituted by a CPU bus.

The host bus 904a is connected to the external bus 904b, such as a peripheral component interconnect/interface (PCI) bus, through the bridge 904. Note that the host bus 904a, the bridge 904, and the external bus 904b do not have to be configured separately and the functions thereof may be implemented in a single bus.

The input device 906 includes input devices for the user to input information, such as a mouse, a keyboard, a touch panel, a button, a microphone, a switch, and a lever, and an input control circuit that generates an input signal on the basis of the input performed by the user and that outputs the input signal to the CPU 901. The output device 907 includes, for example, a display device, such as a liquid crystal display (LCD) device, an organic light emitting diode (OLED) device, or a lamp, and speech output device, such as a speaker.

The storage device 908 is an example of the storage unit of the imaging terminal 100 and is a device for storing data. The storage device 908 may include a recording medium, a recording device that records data in the recording medium, a readout device that reads out data from the recording medium, and a deletion device that deletes data recoded in the recording medium. The storage device 908 drives the hard disk and stores therein programs that the CPU 901 executes and various kinds of data.

The drive 909 is a reader/writer for a recording medium and is built-in the imaging terminal 100 or is externally attached. The driver 909 reads out information recorded in a magnetic disk, an optical disk, or a magneto-optical disc that is mounted thereto or a removable storage medium such as a semiconductor memory and outputs the information to the RAM 903.

The connection port 911 is an interface connected to an external device and is a port for connecting an external device that is capable of data transmission through, for example, a universal serial bus (USB). Furthermore, the communication device 913 is a communication interface constituted by, for example, a communication device or the like for connecting to a communication network. Furthermore, the communication device 913 may be a communication device corresponding to a local area network (LAN), a communication device corresponding to a wireless USB, or a wired communication device that communicates through wire.

It should be understood by those skilled in the art that various modifications, combinations, sub-combinations and alterations may occur depending on design requirements and other factors insofar as they are within the scope of the appended claims or the equivalents thereof.

For example, although in embodiments described above, the analysis processing on the image data and the addition processing of the frame specifying information are performed in the image terminal 100, the present technique is not limited to such an example and the analysis processing and the addition processing may be performed on the server 200 side. In such a case, when the image data and the vocal sound data are acquired by the imaging terminal 100, the data is transmitted to the server 200 at a predetermined timing. The timing of the data transmission may be, for example, when the imaging terminal 100 is connected to the server 200 by the users operation or may be a predetermined time interval. Alternatively, data may be transmitted from the imaging terminal 100 to the server 200 in real time. When the server 200 receives image data and vocal sound data, the controller 220 commands the calculation unit 230 to execute processing of adding specific frame information to the image data.

Furthermore, in embodiments described above, the specific command information is set on the basis of the input vocal sound; however, when input through vocal sound is not allowed, the specific command information may be allowed to be set using a GUI displayed on the display, for example. For example, as illustrated in FIG. 21, selection tabs 610, 620, and 630 having a fixed form associated with the time information, the location information, the person information may be displayed so that the user can selectively set the specific command information. For example, in the case of the time selection tab 610, there are a "one hour before" tab 611, a "30 minutes before" tab 612, a "10 minutes before" tab 613, a "five minutes before" tab 614, and a "one minute before" tab 615. The user selects either one and sets the specific command information related to time.

Settings using such a GUI may be used solely for setting the specific command information and may be used as an aid for the vocal sound command such as commanding the large frame such as time and location before the vocal sound command and presentation of the candidate scenes (for example, presenting a plurality of thumbnails, or the like) after the vocal sound command.

Furthermore, in embodiments described above, processing on the image data after addition of the frame specifying information is not mentioned in particular; however, for example, the frames other than the frame corresponding to the frame specifying information or the frame within a predetermined time before and after the frame corresponding to the frame specifying information may be deleted when a predetermined time has passed after the shooting of the moving image.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processor including:
circuitry configured to
identify a part of a moving image in response to an audible sound input of a user,
wherein the moving image is generated by a capturing of an imaging unit which is attached to the user.

(2)

The information processor according to (1), wherein
the circuitry is further configured to identify the part of the moving image on the basis of command information, and
the command information is determined based on the audible sound.

(3)

The information processor according to (1) or (2), wherein
the command information is determined by analyzing the audible sound that has been input.

(4)

The information processor according to any of (1) to (3), wherein
the audible sound is a vocalized sound that is acquired together with an acquisition of the moving image.

(5)

The information processor according to any of (1) to (4), wherein
the audible sound is a vocal command.

(6)

The information processor according to any of (1) to (5), wherein
the command information includes a preset specific command.

(7)

The information processor according to any of (1) to (6), wherein
the command information includes time information.

(8)

The information processor according to any of (1) to (7), wherein
the command information includes location information.

(9)

The information processor according to any of (1) to (8), wherein
the circuitry is further configured to analyze a correlation between each of the parts of the moving image and the command information.

(10)

The information processor according to any of (1) to (9), wherein
the circuitry is further configured to identify the part of the moving image when the correlation is higher than a predetermined correlation.

(11)

The information processor according to any of (1) to (10), wherein
the part of the moving image is identified by using additional information added to the moving image, and based on correlation with the command information.

(12)

The information processor according to any of (1) to (11), wherein
the additional information includes at least one of positional information at a time when the moving image has been acquired, person information that has been matched with a preregistered face image, and scene information.

(13)

The information processor according to any of (1) to (12), wherein
the circuitry identifies the part of the moving image correlated with the command information on the basis of estimated information obtained as a result of performing machine learning on the moving image.

(14)

The information processor according to any of (1) to (13), wherein
the circuitry is further configured to extract the identified part from the moving image.

(15)

The information processor according to any of (1) to (14), wherein
the circuitry is further configured to initiate a displaying of the part of the moving image that has been extracted on the basis of the command information.

(16)

The information processor according to any of (1) to (15), wherein
the circuitry is further configured to initiate a displaying of information indicating a correlation between the part of the moving image that has been extracted and information based on the audible sound.

(17)

The information processor according to any of (1) to (16), wherein the circuitry is further configured to identify the part of the moving image that has been extracted on the basis of activity information related to an action of the user.

(18)

The information processor according to any of (1) to (17), wherein the information processor further includes the imaging unit.

(19)

The information processor according to any of (1) to (18), wherein the circuitry is further configured to initiate a recording onto a storage unit of information indicating a degree of correlation between each of the parts of the moving image and the command information together with the specifying information.

(20)

The information processor according to any of (1) to (19), wherein the identified part is correlated with one or more frames of the moving image.

(21)

The information processor according to any of (1) to (20), wherein the audible sound is a voice command given by the user.

(22)

The information processor according to any of (1) to (21), wherein the moving image is a video.

(23)

The information processor according to any of (1) to (22), wherein the moving image is generated by a capturing of a camera device which is attached to the user.

(24)

The information processor according to any of (1) to (23), wherein the audible sound is a voice input that includes information related to a content or a subject of an image included in the moving image.

(25)

The information processor according to any of (1) to (24), wherein the circuitry is further configured to identify an end point for making a recording, based on the audible sound.

(26)

The information processor according to any of (1) to (25), wherein the circuitry is further configured to initiate a storage into a storage unit of specifying information that specifies the part of the moving image that has been identified in response to the audible sound.

(27)

The information processor according to any of (1) to (26), wherein the imaging unit is affixed to the user.

(28)

An information processing method including:

generating a moving image by a capturing of an imaging unit which is attached to a user; and identifying a part of the moving image in response to an audible sound input of the user.

(29)

A non-transitory computer-readable medium having embodied thereon a program, which when executed by a computer causes the computer to execute a method, the method including:

generating a moving image by a capturing of an imaging unit which is attached to a user; and identifying a part of the moving image in response to an audible sound input of the user.

(30)

An information processor including:

a processing unit configured to extract a single or a plurality of frames of a moving image on the basis of specific command information set in accordance with a vocal sound that has been input, and configured to cause a storage unit to store frame specifying information that specifies the single or the plurality of frames that have been extracted.

(31)

The information processor according to (30), wherein the specific command information is set by analyzing a vocal sound that has been input.

(32)

The information processor according to (31), wherein the vocal sound is a vocal sound that is acquired together with an acquisition of the moving image.

(33)

The information processor according to any one of (30) to (32), wherein the specific command information is a preset specific command.

(34)

The information processor according to any one of (30) to (33), wherein the specific command information includes time information.

(35)

The information processor according to any one of (30) to (34), wherein the processing unit analyses a correlation between each of the single or the plurality of frames of the moving image and the specific command information.

(36)

The information processor according to (35), wherein the processing unit extracts the single or the plurality of frames when the correlation is higher than a predetermined correlation.

(37)

The information processor according to (35), wherein the processing unit extracts, using additional information added to the moving image, from the moving image, a single or a plurality of frames that are correlated with the specific command information.

(38)

The information processor according to (37), wherein the additional information includes at least one of positional information at the time when the moving image has been acquired, person information that has been matched with a preregistered face image, and scene information.

(39)

The information processor according to (35), wherein the processing unit extracts, from the moving image, a single or a plurality of frames that are correlated with the specific command information on the basis of estimated information obtained as a result of performing machine learning on the moving image.

(40)

The information processor according to any one of (30) to (39), wherein
the processing unit displays on a display a single or a plurality of frames that have been extracted on the basis of the specific command information.

(41)

The information processor according to any one of (30) to (40), further including:
an imaging unit configured to acquire a moving image.

(42)

The information processor according to any one of (30) to (41), wherein
the processing unit causes the storage unit to record information indicating a degree of correlation between each of the single or the plurality of frames of the moving image and the specific command information together with the frame specifying information.

(43)

The information processor according to any one of (30) to (42), wherein
the processing unit presents the single or the plurality of frames that have been extracted on the display as a candidate frame.

(44)

An information processing method including:
extracting a single or a plurality of frames of a moving image on the basis of specific command information set in accordance with a vocal sound that has been input; and
causing a storage unit to store frame specifying information that specifies the single or the plurality of frames that have been extracted.

(45)

A program for causing a computer to execute the processing of:
extracting a single or a plurality of frames of a moving image on the basis of specific command information set in accordance with a vocal sound that has been input; and
causing a storage unit to store frame specifying information that specifies the single or the plurality of frames that have been extracted.

REFERENCE SIGNS LIST 100 imaging terminal
110 imaging unit
120 vocal sound acquisition unit
130 display
140, 220 controller
150, 230 calculation unit
152 specific command information extraction unit
154 frame extraction unit
156 frame specifying information addition unit
160, 210 communication unit
170, 240 storage unit
180 battery
200 server

The invention claimed is:

1. An information processor comprising:
circuitry configured to
control a camera device to capture a moving image,
record the captured moving image in a storage unit,
receive an audible sound input of a user from a microphone,
analyze whether the audible sound input includes a specific command, and
extract a part of the recorded moving image in response to a predetermined time period,
wherein the predetermined time period has a time corresponding to the specific command, and
wherein the extracted part of the recorded moving image is a partial image that was captured before receiving the audible sound input.

2. The information processor according to claim 1, wherein
the circuitry is further configured to control a display device to display thumbnail images of the partial image.

3. The information processor according to claim 1, wherein the information processor further comprises the camera device.

4. The information processor according to claim 1, wherein the moving image is a video.

5. The information processor according to claim 1, wherein
the camera device is a wearable device.

6. An information processing method comprising:
controlling a camera device to capture a moving image;
recording the captured moving image in a storage unit;
receiving an audible sound input of a user from a microphone;
analyzing whether the audible sound input includes a specific command; and
extracting a part of the recorded moving image in response to a predetermined time period,
wherein the predetermined time period has a time corresponding to the specific command, and
wherein the extracted part of the recorded moving image is a partial image that was captured before receiving the audible sound input.

7. A non-transitory computer-readable medium having embodied thereon a program, which when executed by a computer causes the computer to execute a method, the method comprising:
controlling a camera device to capture a moving image;
recording the captured moving image in a storage unit;
receiving an audible sound input of a user from a microphone;
analyzing whether the audible sound input includes a specific command; and
extracting a part of the recorded moving image in response to a predetermined time period,
wherein the predetermined time period has a time corresponding to the specific command, and
wherein the extracted part of the recorded moving image is a partial image that was captured before receiving the audible sound input.

* * * * *